US009315105B2

(12) United States Patent
Sakamoto

(10) Patent No.: US 9,315,105 B2
(45) Date of Patent: Apr. 19, 2016

(54) ELECTRICALLY-DRIVEN VEHICLE AND METHOD FOR CONTROLLING THE SAME

(75) Inventor: Yosei Sakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/374,717

(22) PCT Filed: Mar. 7, 2012

(86) PCT No.: PCT/JP2012/055795
§ 371 (c)(1),
(2), (4) Date: Jul. 25, 2014

(87) PCT Pub. No.: WO2013/132604
PCT Pub. Date: Sep. 12, 2013

(65) Prior Publication Data
US 2014/0371968 A1    Dec. 18, 2014

(51) Int. Cl.
*B60L 11/18* (2006.01)
*B60L 1/00* (2006.01)
*B60L 11/12* (2006.01)
*B60L 11/14* (2006.01)

(52) U.S. Cl.
CPC .............. *B60L 1/006* (2013.01); *B60L 1/003* (2013.01); *B60L 11/126* (2013.01); *B60L 11/14* (2013.01); *B60L 11/18* (2013.01); *B60L 11/1816* (2013.01); *B60L 11/1861* (2013.01); *B60L 11/1868* (2013.01); *B60L 2210/30* (2013.01); *B60L 2210/40* (2013.01); *Y02T 10/6217* (2013.01); *Y02T 10/7005* (2013.01); *Y02T 10/7044* (2013.01); *Y02T 10/7066* (2013.01); *Y02T 10/7077* (2013.01); *Y02T 10/7241* (2013.01); *Y02T 90/127* (2013.01); *Y02T 90/14* (2013.01)

(58) Field of Classification Search
CPC ... B60W 10/30; B60W 20/00; B60L 2210/30; B60L 2210/40; B60L 15/20
USPC ............... 701/22, 54; 180/65.265, 53.1, 54.1, 180/65.1, 65.21; 903/902, 903, 905–907
See application file for complete search history.

(56) References Cited

U.S. PATENT DOCUMENTS 5,473,228 A * 12/1995 Nii ................................ 318/158
5,778,326 A    7/1998 Moroto et al.
(Continued)

FOREIGN PATENT DOCUMENTS

JP    A-2002-374604    12/2002
JP    A-2004-236472    8/2004
(Continued)

*Primary Examiner* — Dalena Tran
(74) *Attorney, Agent, or Firm* — Oliff PLC

(57) ABSTRACT

A bidirectional charger subjects power supplied from an external power supply to voltage conversion and charges a main power storage device and an auxiliary power storage device. Furthermore, the bidirectional charger is configured to be able to convert power in a bidirectional manner so as to be able to subject power stored in the main power storage device or power stored in the auxiliary power storage device to voltage conversion and to output power to electrical outlet. The electrical outlet is configured to be able to output power to an electrical appliance including a home appliance. When a travel driving force increases during use of the electrical outlet, a PM-ECU controls the bidirectional charger in such a way that power stored in the auxiliary power storage device is subjected to voltage conversion and output power to the electrical outlet.

18 Claims, 13 Drawing Sheets

(56) References Cited

U.S. PATENT DOCUMENTS

| | | | |
|---|---|---|---|
| 6,515,872 B2 * | 2/2003 | Nakayama et al. | 363/17 |
| 6,794,846 B2 * | 9/2004 | Tsuji | 320/103 |
| 7,566,232 B2 * | 7/2009 | Iida | 439/145 |
| 2002/0057582 A1 | 5/2002 | Nakayama et al. | |
| 2008/0316774 A1 | 12/2008 | Ito et al. | |
| 2009/0039839 A1 | 2/2009 | Noguchi et al. | |

FOREIGN PATENT DOCUMENTS

| | | |
|---|---|---|
| JP | A-2008-312395 | 12/2008 |
| JP | A-2013-110912 | 6/2013 |

* cited by examiner

ELECTRICALLY-DRIVEN VEHICLE AND METHOD FOR CONTROLLING THE SAME

TECHNICAL FIELD

The present invention relates to an electrically-driven vehicle and a method for controlling the same, and more particularly to an electrically-driven vehicle provided with a power output unit which outputs power to an electrical appliance including a home appliance, and a method for controlling the same.

BACKGROUND ART

In electrically-driven vehicles such as an electric vehicle having a motor as a motive power source which receives a supply of power from a power storage device such as a battery and generates a travel driving force, and a hybrid vehicle further having an engine as a motive power source, there has been proposed a configuration which is able to subject power stored in a power storage device to voltage conversion and output power to an electrical appliance such as a home appliance.

Japanese Patent Laying-Open No. 2002-374604 (PTD 1) discloses a vehicle which is able to convert power stored in a battery to predetermined alternate-current power (for example, AC 100V) and output power. This vehicle includes a battery which supplies power to a traveling motor, and an AC 100V inverter which converts direct-current power outputted from the battery to AC 100V power and outputs power to an AC electrical outlet. In this vehicle, determination is made on whether or not to output the AC 100V output based on a state of the AC 100V inverter, a vehicle control system, the battery, and the like. Thus, according to this vehicle, a favorable drive control of the vehicle can be secured, and the power stored in the battery can be used to output the AC 100V (refer to PTD 1).

CITATION LIST

Patent Document

PTD 1: Japanese Patent Laying-Open No. 2002-374604
PTD 2: Japanese Patent Laying-Open No. 2008-312395
PTD 3: Japanese Patent Laying-Open No. 2004-236472

SUMMARY OF INVENTION

Technical Problem

In the vehicle disclosed in Japanese Patent Laying-Open No. 2002-374604 described above, power is supplied to the AC electrical outlet from the battery which supplies power to the traveling motor. Thus, when motor power increases during use of the AC electrical outlet, there is a possibility that the supply of power to the AC electrical outlet cannot be maintained if a preference is given to securing a traveling performance. On the other hand, if a preference is given to the supply of power to the AC electrical outlet, there is a possibility that the supply of power to the motor is restricted to thereby lower the traveling performance.

This invention was made to solve the problem described above, and its object is to provide an electrically-driven vehicle which is able to supply power to an electrical appliance including a home appliance while maintaining the traveling performance.

Moreover, another object of this invention is to provide a method for controlling an electrically-driven vehicle which is able to supply power to an electrical appliance including a home appliance while maintaining the traveling performance.

Solution to Problem

According to the present invention, an electrically-driven vehicle includes a main power storage device, an electric motor, an auxiliary power storage device, a power output unit, a power conversion device, and a control device. The electric motor receives a supply of power from the main power storage device and generates a travel driving force. The power output unit is configured to be able to output power to an electrical appliance including a home appliance. The power conversion device is electrically connected to the main power storage device, the auxiliary power storage device and the power output unit, and is configured to be able to subject power stored in the main power storage device or power stored in the auxiliary power storage device to voltage conversion and output power to the power output unit. The control device controls the power conversion device to subject power stored in the auxiliary power storage device to voltage conversion and output power to the power output unit when the travel driving force increases during use of the power output unit.

Preferably, during use of the power output unit, when the travel driving force increases to cause an output of the main power storage device to exceed outputtable power indicating power which can be outputted by the main power storage, the control device controls the power conversion device to subject power stored in the auxiliary power storage device to voltage conversion and output power to the power output unit.

Preferably, the power conversion device includes a charger which subjects power supplied from a power supply provided outside of the vehicle to voltage conversion and charges the main power storage device and the auxiliary power storage device. The charger is configured to be able to subject power conversion in a bidirectional manner so as to be able to subject power stored in the main power storage device or power stored in the auxiliary power storage device to voltage conversion and output power to the power output unit.

More preferably, the charger includes a main circuit and a sub power supply circuit. The main circuit is configured to be able to subject voltage conversion in a bidirectional manner between the power supply provided outside of the vehicle and the main power storage device. The sub power supply circuit is configured to be able to subject voltage conversion in a bidirectional manner between the power supply provided outside of the vehicle and the auxiliary power storage device and has a smaller capacity than the main circuit.

Preferably, when the travel driving force increases, the control device further controls a state of charge of the auxiliary power storage device so as to raise a state of charge of the auxiliary power storage device in advance.

More preferably, the electrically-driven vehicle further includes an information device having information related to a traveling path. When an increase in the travel driving force is estimated based on traveling path information from the information device, the control device controls a state of charge of the auxiliary power storage device so as to raise a state of charge of the auxiliary power storage device in advance.

Preferably, the electrically-driven vehicle further includes a voltage converter. The voltage converter subjects power outputted from the main power storage device to voltage conversion and outputs power to the auxiliary power storage device. The power conversion device includes a charger which subjects power supplied from a power supply provided outside of the vehicle to voltage conversion and charges the main power storage device and the auxiliary power storage device. The charger includes a main circuit and a sub power supply circuit. The main circuit is configured to be able to subject voltage conversion in a bidirectional manner between the power supply provided outside of the vehicle and the main power storage device. The sub power supply circuit is configured to be able to subject voltage conversion in a bidirectional manner between the power supply provided outside of the vehicle and the auxiliary power storage device and has a smaller capacity than the main circuit. The sub power supply circuit is electrically connected to the main circuit on a side of the main power storage device. In a case where the control device controls a state of charge of the auxiliary power storage device so as to raise a state of charge of the auxiliary power storage device in advance, when power supplied to the auxiliary power storage device is within rating of the sub power supply circuit, the control device controls the sub power supply circuit such that power is supplied from the main power storage device to the auxiliary power storage device by the sub power supply circuit, and when power supplied to the auxiliary power storage device exceeds rating of the sub power supply circuit, the control device controls the voltage converter such that power is supplied from the main power storage device to the auxiliary power storage device by the voltage converter.

Moreover, according to this invention, a control method is a method for controlling an electrically-driven vehicle. The electrically-driven vehicle includes a main power storage device, an electric motor, an auxiliary power storage device, a power output unit, and a power conversion device. The electric motor receives a supply of power from the main power storage device and generates a travel driving force. The power output unit is configured to be able to output power to an electrical appliance including a home appliance. The power conversion device is electrically connected to the main power storage device, the auxiliary power storage device and the power output unit, and is configured to be able to subject power stored in the main power storage device or power stored in the auxiliary power storage device to voltage conversion and output power to the power output unit. The controlling method includes the steps of determining whether or not a use of the power output unit is requested, and controlling the power conversion device to subject power stored in the auxiliary power storage device to voltage conversion and output power to the power output unit when the travel driving force increases in a case where a use of the power output unit is requested.

Preferably, the step of controlling the power conversion device includes the steps of determining whether or not an increase in the travel driving force causes an output of the main power storage device to exceed outputtable power indicating power which can be outputted by the main power storage device during use of the power output unit, and controlling the power conversion device to subject power stored in the auxiliary power storage device to voltage conversion and output power to the power output unit when it is determined that an output of the main power storage device exceeds the outputtable power.

Preferably, the controlling method further includes the step of controlling a state of charge of the auxiliary power storage device so as to raise a state of charge of the auxiliary power storage device in advance when the travel driving force increases.

More preferably, the electrically-driven vehicle further includes a voltage converter. The voltage converter subjects power outputted from the main power storage device to voltage conversion and outputs power to the auxiliary power storage device. The power conversion device includes a charger which subjects power supplied from a power supply provided outside of the vehicle to voltage conversion and charges the main power storage device and the auxiliary power storage device. The charger includes a main circuit and a sub power supply circuit. The main circuit is configured to be able to subject voltage conversion in a bidirectional manner between the power supply provided outside of the vehicle and the main power storage device. The sub power supply circuit is configured to be able to subject voltage conversion in a bidirectional manner between the power supply provided outside of the vehicle and the auxiliary power storage device and has a smaller capacity than the main circuit. The sub power supply circuit is electrically connected to the main circuit on a side of the main power storage device. The step of controlling a state of charge of the auxiliary power storage device includes the steps of determining whether or not power supplied to the auxiliary power storage device is within rating of the sub power supply circuit, controlling the sub power supply circuit such that power is supplied from the main power storage device to the auxiliary power storage device by the sub power supply circuit when it is determined that the power is within rating of the sub power supply circuit in the step of determining, and controlling the voltage converter such that power is supplied from the main power supply circuit to the auxiliary power storage device by the voltage converter when it is determined that power exceeds the rating of the sub power supply circuit in the step of determining.

Advantageous Effects of Invention

According to the present invention, when a travel driving force increases during use of the power output unit, the power conversion device is controlled so as to subject power stored in the auxiliary power storage device to voltage conversion and output power to the power output unit. Accordingly, it would not be necessary to allow power outputted from the main power storage device during use of the power output unit to be distributed to the power output unit. Thus, according to the present invention, power can be supplied to an electrical appliance including a home appliance while securing traveling performance.

DESCRIPTION OF EMBODIMENTS

Figure 1:
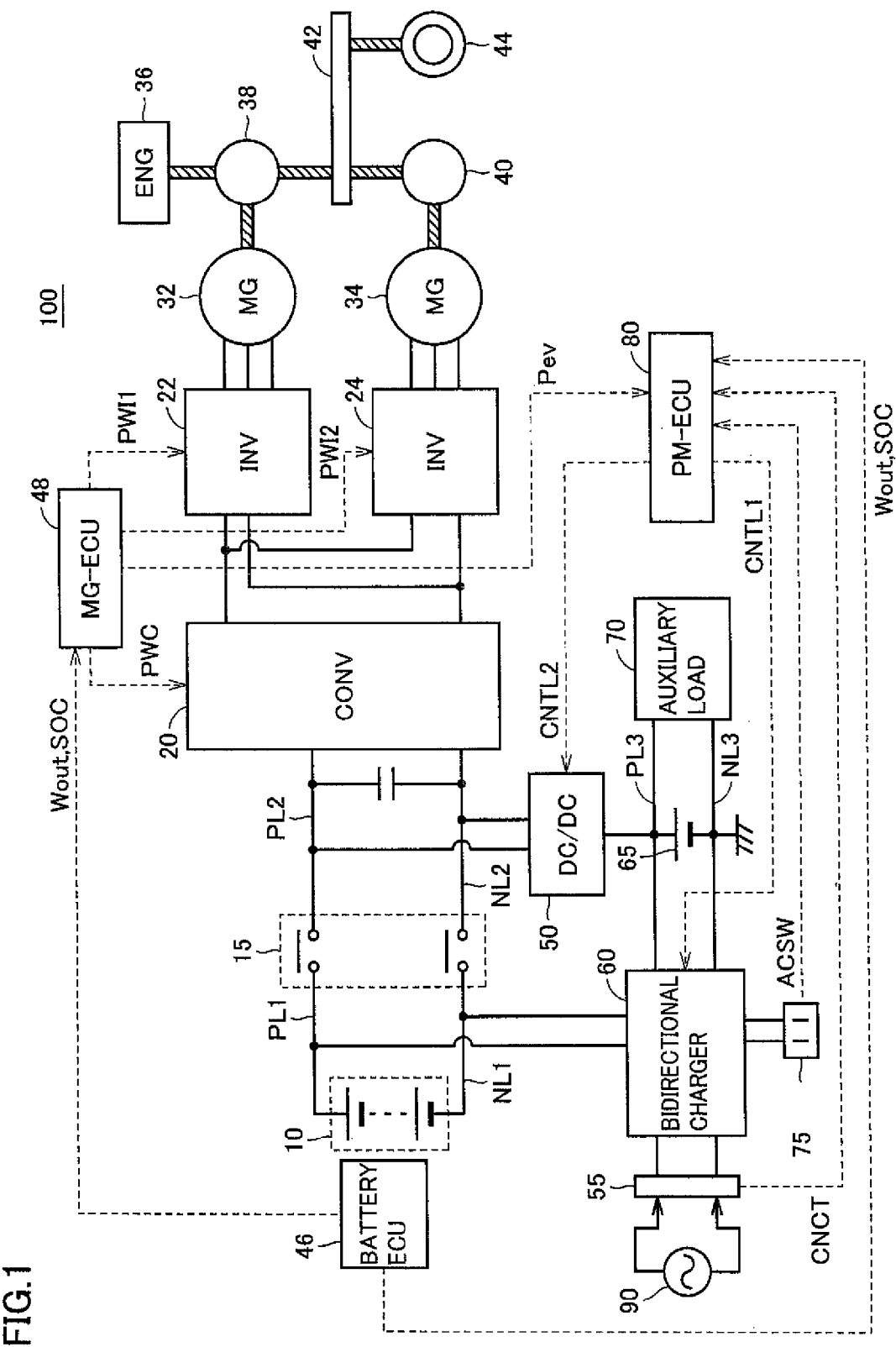
FIG. 1 represents an overall configuration of a hybrid vehicle shown as one example of an electrically-driven vehicle according to a first embodiment of the present invention.

Hereinafter, embodiments of the present invention will be described with reference to the drawings. In the drawings, the same or corresponding parts have the same reference numerals allotted, and description thereof will not be repeated.

First Embodiment

FIG. 1 represents an overall configuration of a hybrid vehicle shown as one example of an electrically-driven vehicle according to the first embodiment of the present invention. Referring to FIG. 1, a hybrid vehicle 100 includes a main power storage device 10, a system main relay (hereinafter, also referred to as "SMR (System Main Relay)") 15, a converter 20, inverters 22, 24, and motor generators 32, 34. Further, hybrid vehicle 100 further includes an engine 36, planetary gears 38, 40, a transmission gear 42, drive wheels 44, a DC/DC converter 50, positive lines PL1, PL2, and negative lines NL1, NL2.

Main power storage device 10 is a rechargeable direct-current power supply, and is constituted of, for example, a secondary battery of nickel metal hydride, lithium ion, or the like. Main power storage device 10 stores power supplied from a power supply provided outside of the vehicle (hereinafter, referred to as "external power supply") 90 as well as power generated by motor generators 32, 34. A capacitor having a large capacity may also be used as main power storage device 10.

Main power storage device 10 supplies stored power to converter 20. Moreover, main power storage device 10 can supply power via DC/DC converter 50 to a positive line PL3 and a negative line NL3 to which an auxiliary power storage device 65 and an auxiliary load 70 are connected. Further, main power storage device 10 can supply power also to an electrical outlet 75 via a bidirectional charger 60.

SMR 15 is provided between a positive line PL1, a negative line NL1 connected to main power storage device 10 and a positive line PL2, a negative line NL2 connected to converter 20. SMR 15 is a relay for performing electrical connection/disconnection between positive line PL1, negative line NL1 and positive line PL2, negative line NL2.

Converter 20 is provided between positive line PL2, negative line NL2 and inverters 22, 24. Converter 20 raises an input voltage of inverters 22, 24 (a voltage between converter 20 and inverters 22, 24) to be higher than or equal to a voltage of main power storage device 10 based on a signal PWC from an MG-ECU 48. Converter 20 is constituted of, for example, a current reversible chopper circuit.

Inverters 22, 24 are connected to converter 20 in parallel with each other. Inverter 22 drives motor generator 32 based on a signal PWI1 from MG-ECU 48. Inverter 24 drives motor generator 34 based on a signal PWI2 from MG-ECU 48. Each of inverters 22, 24 is constituted of, for example, a three-phase PWM inverter including switching elements for three phases.

Each of motor generators 32, 34 is a motor generator capable of performing powering operation and regenerative operation, and is constituted of, for example, a three-phase alternate-current synchronous motor generator having a permanent magnet buried in a rotor. Motor generator 32 is mechanically connected to planetary gear 38. Motor generator 32 generates starting torque of engine 36 mechanically coupled via planetary gear 38 and starts engine 36. After engine 36 is started, motor generator 32 is driven by engine 36 and generates power.

Motor generator 34 is mechanically connected to planetary gear 40. Motor generator 34 then generates driving torque for traveling and drives drive wheels 44 via planetary gear 40 and transmission gear 42. At the time of braking of the vehicle, motor generator 34 receives kinetic energy of the vehicle from drive wheels 44 and generates power. Planetary gear 40 shifts an output of motor generator 34 and transmits the output to transmission gear 42. It should be noted that planetary gear 40 may be omitted, and motor generator 34 may be directly connected to transmission gear 42.

Engine 36 converts thermal energy generated by combustion of fuel to kinetic energy for motion elements such as a piston, a rotor, or the like, and outputs the converted kinetic energy to at least one of drive wheels 44 and motor generator 32 via planetary gear 38. In other words, planetary gear 38 is mechanically connected to motor generator 32, engine 36, and transmission gear 42, and the output of engine 36 is distributed to motor generator 32 and transmission gear 42 and outputted.

DC/DC converter 50 is connected between positive line PL2, negative line NL2 and positive line PL3, negative line NL3. DC/DC converter 50 converts power supplied from positive line PL2, negative line NL2 to a voltage level of auxiliary load 70 and outputs power to positive line PL3 based on a signal CNTL2 from PM-ECU 80.

Moreover, hybrid vehicle 100 further includes a power receiving unit 55, bidirectional charger 60, auxiliary power storage device 65, auxiliary load 70, electrical outlet 75, positive line PL3, and negative line NL3. Further, hybrid vehicle 100 includes a battery ECU (Electronic Control Unit) 46, MG-ECU 48, and PM-ECU 80.

Power receiving unit 55 is configured to be connectable to external power supply 90 and outputs power supplied from external power supply 90 to bidirectional charger 60. Moreover, power receiving unit 55 outputs a connection signal CNCT indicating a connection state with external power supply 90 to PM-ECU 80. When external power supply 90 is connected to power receiving unit 55, power receiving unit 55 activates connection signal CNCT. Power receiving unit 55 may be constituted of an inlet which can be engaged with a connector on a side of external power supply 90, or a plug which can be engaged with an outlet of external power supply 90.

Bidirectional charger 60 is electrically connected to power receiving unit 55, positive line PL1 and negative line NL1 to which main power storage device 10 is connected, positive line PL3 and negative line NL3 to which auxiliary power storage device 65 and auxiliary load 70 are connected, and electrical outlet 75. Bidirectional charger 60 converts power supplied from external power supply 90 to a voltage level of main power storage device 10 and outputs power to positive line PL1 and negative line NL1 based on a signal CNTL1 from PM-ECU 80, and charges main power storage device 10.

Further, bidirectional charger 60 converts power supplied from external power supply 90 to a voltage level of auxiliary load 70 and outputs power to positive line PL3 and negative line NL3, and supplies power to auxiliary load 70.

Further, bidirectional charger 60 is configured to be able to subject power outputted from main power storage device 10 to voltage conversion and output power to electrical outlet 75. Moreover, bidirectional charger 60 is further configured to be able to subject power outputted from auxiliary power storage device 65 to voltage conversion and output power to electrical outlet 75. In other words, bidirectional charger 60 can subject power supplied from external power supply 90 to voltage conversion, and charge main power storage device 10 and supply power to auxiliary load 70, and can subject power stored in main power storage device 10 and auxiliary power storage device 65 to voltage conversion and output power to electrical outlet 75. As one example, bidirectional charger 60 subjects power stored in main power storage device 10 and auxiliary power storage device 65 to voltage conversion to AC 100V and outputs power to electrical outlet 75. Detailed configuration of bidirectional charger 60 will be described later.

Auxiliary power storage device 65 is a rechargeable direct-current power supply and is constituted of, for example, a secondary battery of lead, nickel-metal hydride, lithium ion, or the like. A capacitor may be used in place of the secondary battery. Auxiliary power storage device 65 is connected to positive line PL3 and negative line NL3 and receives power from bidirectional charger 60 or DC/DC converter 50 to be charged. Auxiliary load 70 generally represents an auxiliary of hybrid vehicle 100 which receives power from DC/DC converter 50, bidirectional charger 60, or auxiliary power storage device 65 charged by those and operates.

Electrical outlet 75 is a power output unit which outputs power to an electrical appliance such as a home appliance, a personal computer, or the like. Electrical outlet 75 is electrically connected to bidirectional charger 60 and outputs power received from bidirectional charger 60 to an electrical appliance connected to electrical outlet 75. Moreover, for electrical outlet 75, an AC switch (not illustrated) for rendering it to be usable is provided. When the AC switch is turned on, a signal ACSW outputted to PM-ECU 80 is activated.

Battery ECU 46 sets outputtable power Wout indicating power which can be outputted by main power storage device 10. Outputtable power W is set through a software processing of executing pre-stored program at a CPU (Central Processing Unit) and/or a hardware processing by means of a dedicated electronic circuit. Outputtable power Wout is set to suppress over-discharging of main power storage device 10. Moreover, battery ECU 46 calculates a state of charge of main power storage device 10 (hereinafter, referred to as "SOC (State Of Charge)," and is expressed for example by a percentage with respect to a capacity of main power storage device 10). As a method for calculating the SOC, various known methods can be used, such as a calculation method of using a relationship between an open circuit voltage (OCV (Open Circuit Voltage)) and an SOC of main power storage device 10, a calculation method of using an integrated value of an input/output current, and the like. Battery ECU 46 then outputs outputtable power Wout and the SOC of main power storage device 10 to MG-ECU 48 and PM-ECU 80.

MG-ECU 48 controls operation of converter 20 and inverters 22, 24 through a software processing of executing pre-stored program at a CPU and/or a hardware processing by means of a dedicated electronic circuit. Specifically, MG-ECU 48 calculates a requested value of traveling power (hereinafter, referred to as "requested traveling power") from an operation amount on an accelerator pedal, a vehicle speed, and the like. MG-ECU 48 then generates a signal for driving motor generator 34 (for example, PWM (Pulse Width Modulation) signal) based on the calculated requested traveling power, and outputs the generated signal as signal PWI2 to inverter 24.

When the requested traveling power exceeds outputtable power Wout of main power storage device 10, MG-ECU 48 generates a signal for driving motor generator 32 (for example, PWM signal) and outputs the generated signal as signal PWI1 to inverter 22. Accordingly, engine 36 is started. Further, when the SOC is lowered to a predetermined threshold value indicating lowering of the SOC of main power storage device 10, MG-ECU 48 also generates signal PWI1 and outputs the signal to inverter 22 to start engine 36. Accordingly, motor generator 32 generates power with use of an output of engine 36, so that main power storage device 10 is charged.

In the following, traveling with use of only motor generator 34 prior to starting of engine 36 will be referred to as EV (Electric Vehicle) traveling, and traveling with operation of engine 36 will be referred to as HV (Hybrid Vehicle) traveling. MG-ECU 48 then outputs requested traveling power during EV traveling as EV requested power Pev to PM-ECU 80. Moreover, MG-ECU 48 generates a signal for driving converter 20 (for example, PWM signal) and outputs the generated signal as signal PWC to converter 20.

PM-ECU 80 controls operation of bidirectional charger 60 through a software processing of executing pre-stored program at a CPU and/or a hardware processing by means of a dedicated electronic circuit. Specifically, during charging of main power storage device 10 by external power supply 90 (hereinafter referred to as "external charging"), PM-ECU 80 generates signal CNTL1 for driving bidirectional charger 60 so as to supply power received from power receiving unit 55 to main power storage device 10 and auxiliary load 70 and outputs the signal to bidirectional charger 60.

Moreover, PM-ECU 80 determines use/non-use of electrical outlet 75 based on signal ACSW from electrical outlet 75 and executes a control of supplying power from bidirectional charger 60 to electrical outlet 75 during the use of electrical outlet 75. Specifically, when EV requested power Pev received from MG-ECU 48 increases during the use of electrical outlet 75, PM-ECU 80 generates signal CNTL1 so as to subject power stored in auxiliary power storage device 65 to voltage conversion and supply power to electrical outlet 75. For example, when EV requested power Pev increases to an extent that a sum of EV requested power Pev and an output from electrical outlet 75 exceeds outputtable power Wout of main power storage device 10, PM-ECU 80 generates CNTL1 so as to subject power stored in auxiliary power storage device 65 to voltage conversion and output power to electrical outlet 75.

On the other hand, when EV requested power Pev is not large, PM-ECU 80 generates signal CNTL1 so as to supply power stored in main power storage device 10 to electrical outlet 75. For example, when EV requested power Pev is not large to an extent that a sum of EV requested power Pev and an output from electrical outlet 75 is smaller than outputtable power Wout of main power storage device 10, PM-ECU 80 generates signal CNTL1 so as to subject power stored in main power storage device 10 to voltage conversion and supply power to electrical outlet 75. PM-ECU 80 then outputs generated signal CNTL1 to bidirectional charger 60.

Moreover, in a case where power receiving unit 55 is not connected to external power supply 90 (for example, during traveling), and when the SOC of auxiliary power storage device 65 is lowered, PM-ECU 80 generates signal CNTL2 so as to supply power from positive line PL2 and negative line NL2 to auxiliary power storage device 65 and auxiliary load 70 and outputs generated signal CNTL2 to bidirectional charger 60.

Figure 2:
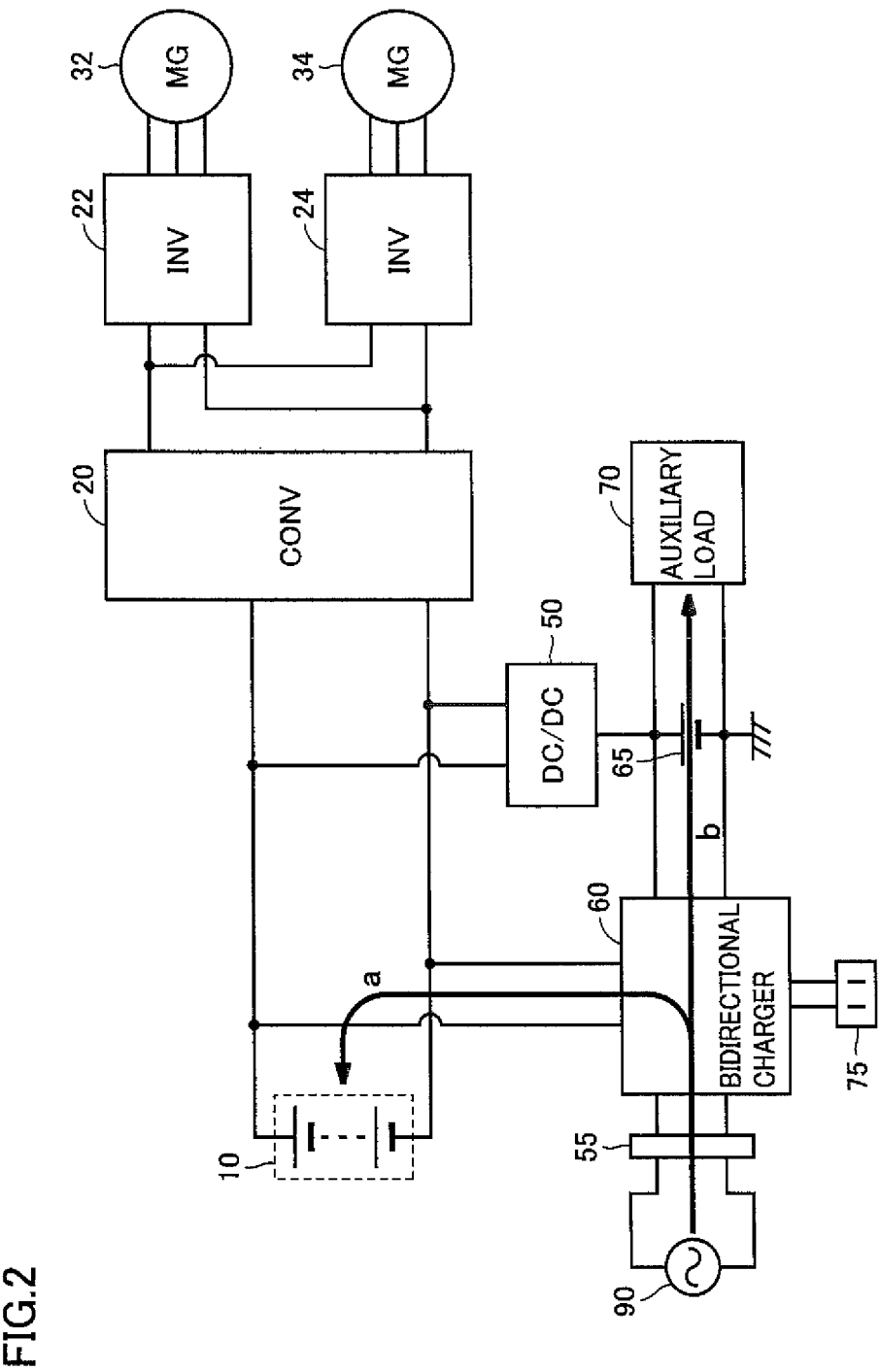
FIG. 2 represents a flow of power during external charging.

FIG. 2 represents a flow of power during external charging. Referring to FIG. 2, during the external charging, bidirectional charger 60 is used to charge main power storage device 10 by external power supply 90 (path "a"). Moreover, during the external charging, bidirectional charger 60 is used to supply power from external power supply 90 to auxiliary load 70 (path "b").

Figure 3:
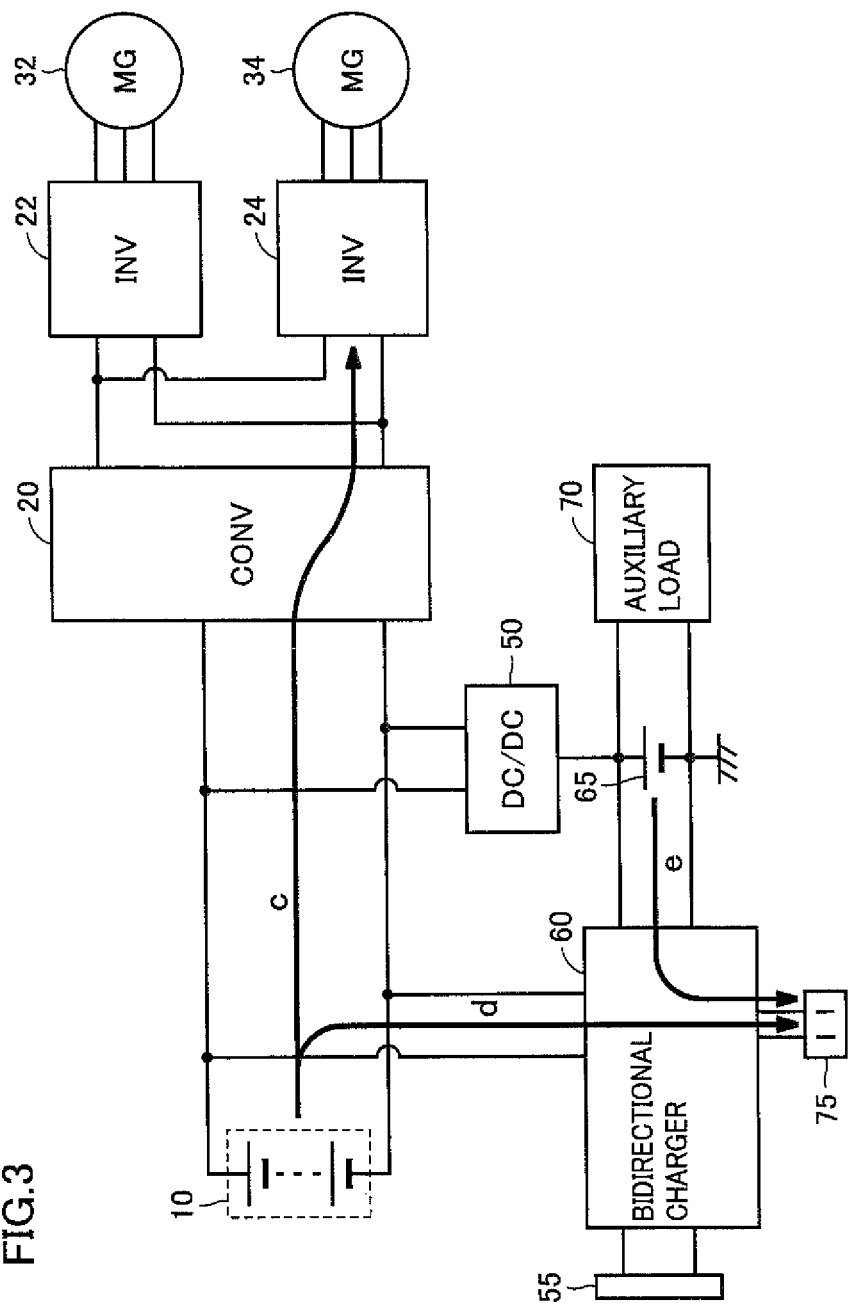
FIG. 3 represents a flow of power during use of an electrical outlet.

FIG. 3 represents a flow of power during use of electrical outlet 75. Referring to FIG. 3, when traveling requested power (EV requested power Pev) which is necessary for traveling is not large, power is supplied from main power storage device 10 via converter 20 to inverter 24 (path "c"), and power is supplied from main power storage device 10 via bidirectional charger 60 to electrical outlet 75 (path "d"). The power of path "c" is zero during stopping. On the other hand, when traveling requested power (EV requested power Pev) increases, for a supply of power to electrical outlet 75, power is supplied from auxiliary power storage device 65 via bidirectional charger 60 to electrical outlet 75 (path "e").

Accordingly, electrical outlet 75 can be used while securing the EV traveling performance. In other words, since the traveling power and an output of the electrical outlet conventionally have been covered only with an output of main power storage device 10, even when the traveling power does not reach outputtable power Wout of main power storage device 10, engine 36 starts when a sum of the traveling power and the output of the electrical outlet reaches outputtable power Wout. In other words, engine 36 is readily started during the use of electrical outlet 75 (reduction of EV traveling range) in a case where a preference is given to the use of electrical outlet 75, while electrical outlet 75 is disabled when a sum of the traveling power and the output of the electrical outlet exceeds outputtable power Wout in a case where a preference is given to securing of the EV traveling performance.

On the other hand, in this first embodiment, when a sum of the raveling power and the output of the electrical outlet reaches outputtable power Wout, power is supplied from auxiliary power storage device 65 via bidirectional charger 60 to electrical outlet 75. Accordingly, the EV traveling can be performed until the traveling power reaches outputtable power Wout, and the use of electrical outlet 75 can be secured.

Figure 4:
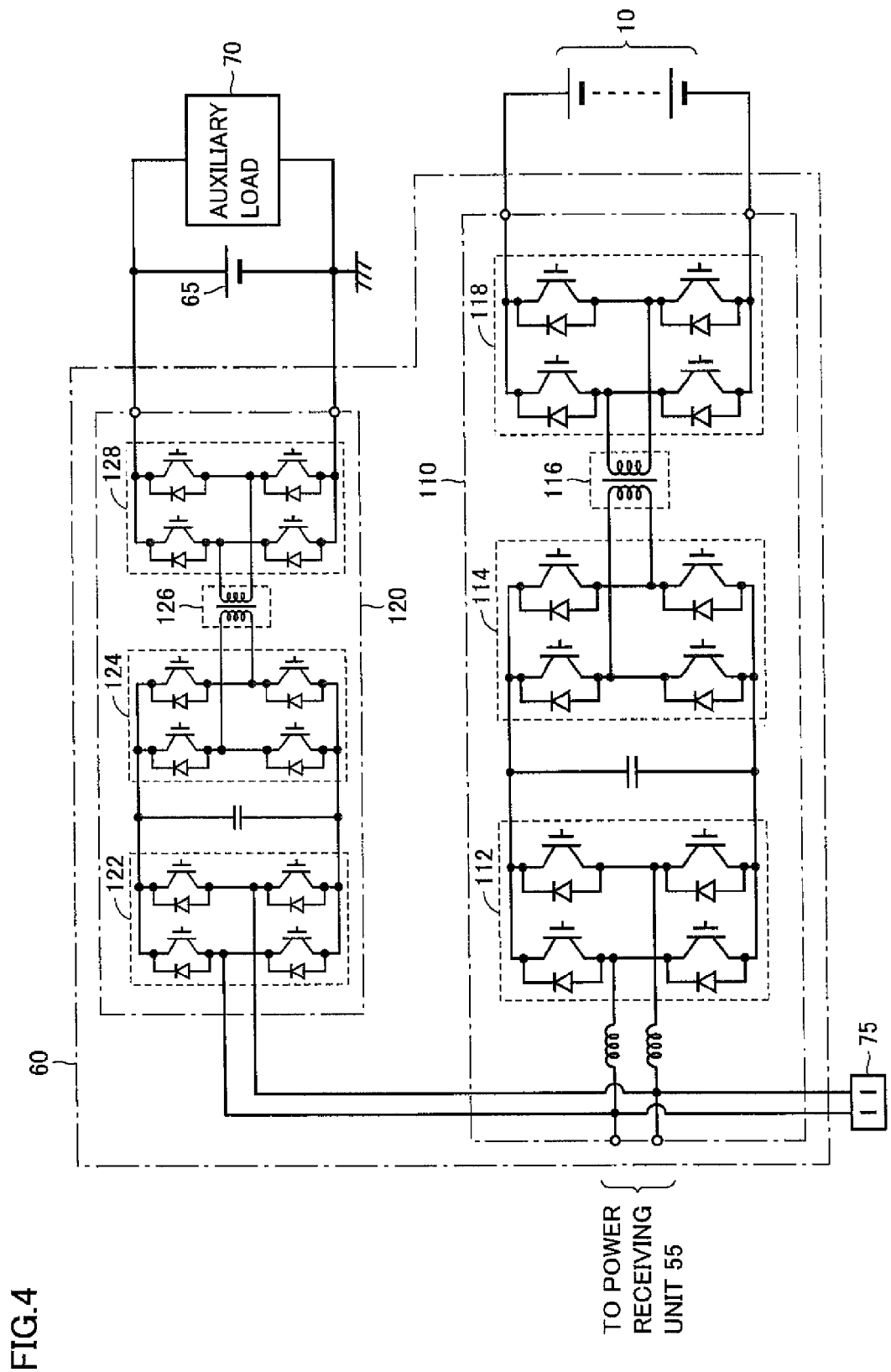
FIG. 4 represents a circuit of the bidirectional charger shown in FIG. 1.

FIG. 4 represents a circuit of bidirectional charger 60 shown in FIG. 1. Referring to FIG. 4, bidirectional charger 60 includes a main circuit 110 and a sub power supply circuit 120. Main circuit 110 includes AC/DC conversion units 112, 114, 118, and insulation transformer 116.

Each of AC/DC conversion units 112, 114, 118 is constituted of a single-phase bridge circuit and can perform power conversion in a bidirectional manner. AC/DC conversion unit 112 converts alternate-current power from external power supply 90 inputted from power receiving unit 55 during external charging to direct-current power and outputs power to AC/DC conversion unit 114 based on signal CNTL1 from PM-ECU 80 (FIG. 1). Moreover, during a supply of power from main power storage device 10 to electrical outlet 75, AC/DC conversion unit 112 can convert direct-current power received from AC/DC conversion unit 114 to alternate-current power and supply power to electrical outlet 75.

During the external charging, AC/DC conversion unit 114 converts direct-current power received from AC/DC conversion unit 112 to high-frequency alternate-current power and outputs power to insulation transformer 116. Moreover, during a supply of power from main power storage device 10 to electrical outlet 75, AC/DC conversion unit 114 can convert alternate-current power received from insulation transformer 116 to direct-current power and output power to AC/DC conversion unit 112.

Insulation transformer 116 includes a core made of magnetic material, and a primary coil and a secondary coil wound around the core. The primary coil and the secondary coil are electrically insulated and are connected respectively to AC/DC conversion units 114, 118. Insulation transformer 116 then performs voltage conversion between AC/DC conversion units 114, 118 in accordance with a winding ratio of the primary coil and the secondary coil.

During the external charging, AC/DC conversion unit 118 converts alternate-current power outputted from insulation transformer 116 to direct-current power and outputs power to main power storage device 10 (FIG. 1). Moreover, during a supply of power from main power storage device 10 to electrical outlet 75, AC/DC conversion unit 118 can convert direct-current power outputted from main power storage device 10 to high-frequency alternate-current power and output power to insulation transformer 116.

Electrical outlet 75 is then connected to AC/DC conversion unit 112 on a side of power receiving unit 55. The location of connection of electrical outlet 75 is not limited to this. Electrical outlet 75 may be connected to a primary side or a secondary side of insulation transformer 116. Electrical outlet 75 may also be connected to the direct-current line between AC/DC conversion unit 112 and AC/DC conversion unit 114 as long as the output of electrical outlet 75 is direct-current power.

Sub power supply circuit 120 is connected to AC/DC conversion unit 112 of main circuit 110 on a side of power receiving unit 55. A circuit configuration of sub power supply circuit 120 is similar to that of main circuit 110. However, a capacity of sub power supply circuit 120 is smaller than that of main circuit 110. This is because sub power supply circuit 120 is provided to obtain auxiliary power during external charging from external power supply 90, and a capacity is sufficient even if it is smaller than that of main circuit 110.

Sub power supply circuit 120 includes AC/DC conversion units 122, 124, 128 and an insulation transformer 126. Each of AC/DC conversion units 122, 124, 128 is constituted of a single-phase bridge circuit and can perform power conversion in a bidirectional manner. AC/DC conversion unit 122 converts alternate-current power from external power supply 90 inputted from power receiving unit 55 during eternal charging to direct-current power and outputs power to AC/DC conversion unit 124 based on signal CNTL1 from PM-ECU 80. Moreover, during a supply of power from auxiliary power storage device 65 to electrical outlet 75, AC/DC conversion unit 122 can convert direct-current power received from AC/DC conversion unit 124 to alternate-current power and supply power to electrical outlet 75.

During the external charging, AC/DC conversion unit 124 converts direct-current power received from AC/DC conversion unit 122 to high-frequency alternate-current power and outputs power to insulation transformer 126. Moreover, during a supply of power from auxiliary power storage device 65 to electrical outlet 75, AC/DC conversion unit 124 can convert alternate-current power received from insulation transformer 126 to direct-current power and output power to AC/DC conversion unit 122.

Insulation transformer 126 includes a core made of magnetic material, and a primary coil and a secondary coil wound around the core. The primary coil and the secondary coil are electrically insulated and are connected respectively to AC/DC conversion units 124, 128. Insulation transformer 126 then performs voltage conversion between AC/DC conversion units 124, 128 in accordance with a winding ratio of the primary coil and the secondary coil.

During the external charging, AC/DC conversion unit 128 converts alternate-current power outputted from insulation transformer 126 to direct-current power and outputs power to auxiliary power storage device 65. Moreover, during a supply of power from auxiliary power storage device 65 to electrical outlet 75, AC/DC conversion unit 128 can convert direct-current power outputted from auxiliary power storage device 65 to high-frequency alternate-current power and output power to insulation transformer 126.

In this bidirectional charger 60, during the external charging, power from external power supply 90 inputted from power receiving unit 55 is converted to direct-current power by AC/DC conversion unit 112 of main circuit 110, and converted to high-frequency alternate-current power by AC/DC conversion unit 114. High-frequency alternate-current power outputted from AC/DC conversion unit 114 is given via insulation transformer 116 to AC/DC conversion unit 118, converted by AC/DC conversion unit 118 to direct-current power, and supplied to main power storage device 10.

During the external charging, a part of power from external power supply 90 inputted from power receiving unit 55 is further converted by AC/DC conversion unit 122 of sub power supply circuit 120 to direct-current power, and converted by AC/DC conversion unit 124 to high-frequency alternate-current power. High-frequency alternate-current power outputted from AC/DC conversion unit 124 is given via insulation transformer 126 to AC/DC conversion unit 128, converted by AC/DC conversion unit 128 to direct-current power, and supplied to auxiliary load 70 and auxiliary power storage device 65.

On the other hand, during a supply of power from main power storage device 10 to electrical outlet 75, power outputted from main power storage device 10 is converted by AC/DC conversion unit 118 of main circuit 110 to high-frequency alternate-current power. High-frequency alternate-current power outputted from AC/DC conversion unit 118 is given via insulation transformer 116 to AC/DC conversion unit 114, converted by AC/DC conversion unit 112 to alternate-current power, and supplied to electrical outlet 75.

Moreover, during a supply of power from auxiliary power storage device 65 to electrical outlet 75, power outputted from auxiliary power storage device 65 is converted by AC/DC conversion unit 128 of sub power supply circuit 120 to high-frequency alternate-current power. High-frequency alternate-current power outputted from AC/DC conversion unit 128 is given via insulation transformer 126 to AC/DC conversion unit 124, converted by AC/DC conversion unit 122 to alternate-current power, and supplied to electrical outlet 75.

Figure 5:
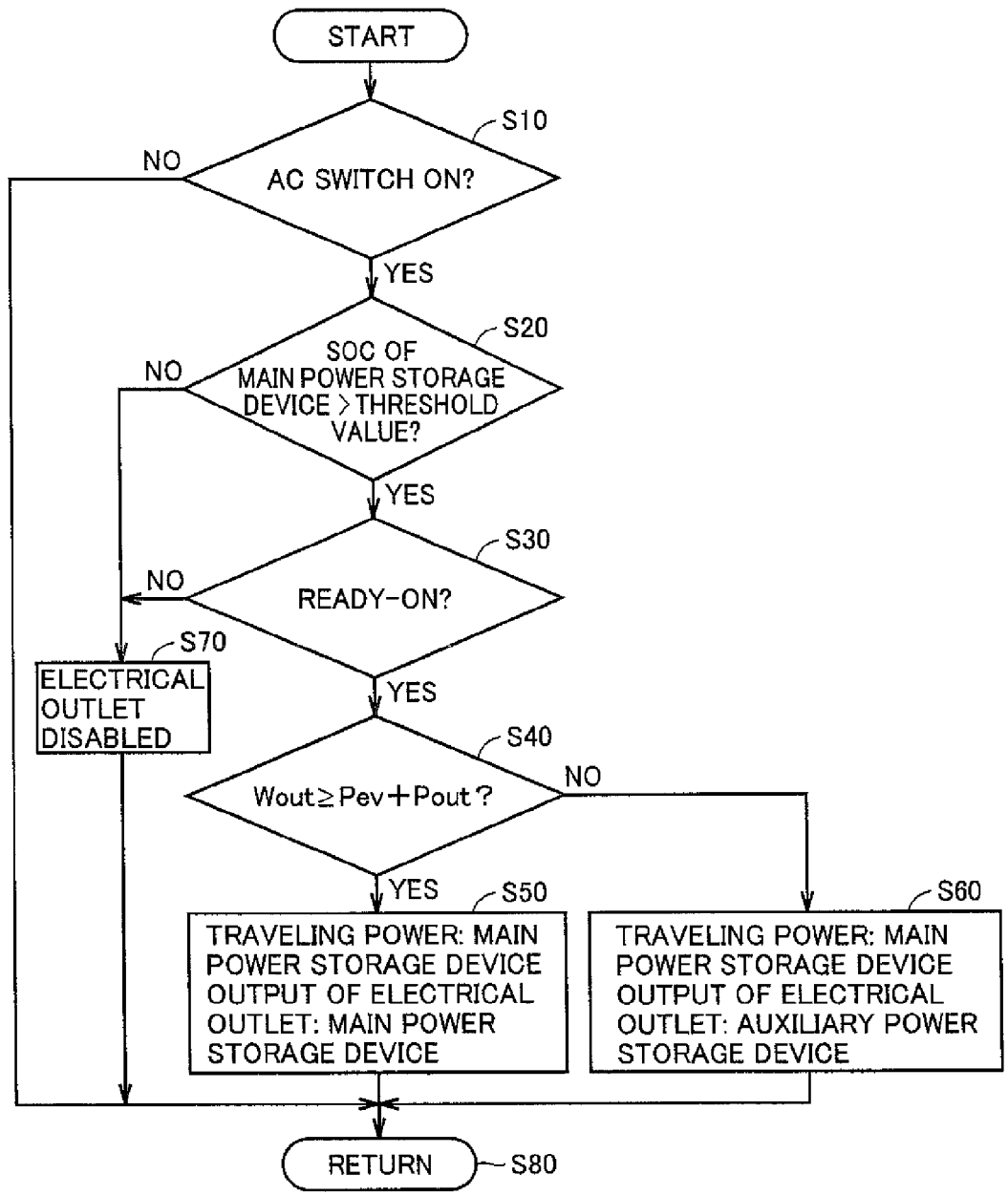
FIG. 5 represents a flowchart for determining a power supply path to the electrical outlet.

FIG. 5 represents a flowchart for determination of a power supply path to electrical outlet 75. It should be noted that the processes shown in this flowchart are invoked from a main routine at every constant time or at each time when a certain condition is met, and then the processes are executed. Referring to FIG. 5, PM-ECU 80 determines whether or not an AC switch for allowing a user to request use of electrical outlet 75 is turned on (step S10). When it is determined that the AC switch is turned off (NO in step S10), PM-ECU 80 shifts the process to step S80 without executing subsequent series of processes.

In step S10, when it is determined that the AC switch is turned on (YES in step S10), PM-ECU 80 determines whether or not the SOC of main power storage device 10 is higher than a predetermined threshold value indicating lowering of the SOC (step S20). When it is determined that the SOC is higher than the threshold value (YES in step S20), PM-ECU 80 determines whether or not a state of the vehicle is in a READY-ON state (step S30). The READY-ON state indicates that a vehicle system is started.

When it is determined that the state of the vehicle is in the READY-ON state (YES in step S30), PM-ECU 80 determines whether or not a sum of EV requested power Pev received from MG-ECU 48 (FIG. 1) and an output power Pout indicating power outputted from electrical outlet 75 is smaller than or equal to outputtable power Wout of main power storage device 10 (step S40). Output power Pout is detected by a power sensor, a voltage sensor, and a current sensor, which are not illustrated in the drawings. Rated power of electrical outlet 75 indicating maximum used power of electrical outlet 75 may be used in place of output power Pout of a measured value.

When it is determined that a sum of EV requested power Pev and output power Pout of electrical outlet 75 is smaller than or equal to outputtable power Wout of main power storage device 10 (YES in step S40), PM-ECU 80 controls inverter 24 and converter 20 so that motor generator 34 generates EV requested power Pev, and controls bidirectional charger 60 so that power is supplied from main power storage device 10 to electrical outlet 75 (step S50). Accordingly, traveling power is supplied via path "c" shown in FIG. 3 from main power storage device 10 to motor generator 34, and power is supplied via path "d" from main power storage device 10 to electrical outlet 75.

On the other hand, in step S40, when it is determined that a sum of EV requested power Pev and output power Pout of electrical outlet 75 is larger than outputtable power Wout of main power storage device 10 (NO in step S40), PM-ECU 80 controls inverter 24 and converter 20 so that motor generator 34 generates EV requested power Pev, and controls bidirectional charger 60 so that power is supplied from auxiliary power storage device 65 to electrical outlet 75 (step S60). Accordingly, traveling power is supplied via path "c" shown in FIG. 3 from main power storage device 10 to motor generator 34, and power is supplied via path "e" from auxiliary power storage device 65 to electrical outlet 75.

When it is determined that the SOC of main power storage device 10 is smaller than or equal to a threshold value in step S20 (NO in step S20), or when it is determined that the state of the vehicle is not in the READY-ON state in step S30 (NO in step S30), PM-ECU 80 disables use of electrical outlet 75 (step S70). The disabling of electrical outlet 75 is achieved by, for example, shutting down bidirectional charger 60, turning off a non-illustrated relay provided between bidirectional charger 60 and electrical outlet 75, or the like.

As described above, in the first embodiment, when travel driving force (EV requested power Pev) increases during the use of electrical outlet 75, power stored in auxiliary power storage device 65 is outputted via sub power supply circuit 120 of bidirectional charger 60 to electrical outlet 75. Accordingly, it is not necessary to distribute power outputted from main power storage device 10 during the use of electrical outlet 75 to electrical outlet 75. Thus, according to this first embodiment, power can be supplied to an electrical appliance including a home appliance while securing traveling performance.

Moreover, according to this first embodiment, the charger for external charging is set to be bidirectional so that power can be outputted from main power storage device 10 and auxiliary power storage device 65 to electrical outlet 75. Therefore, it is not necessary to separately provide a dedicated converter for outputting power to electrical outlet 75.

Further, according to this first embodiment, in bidirectional charger 60, sub power supply circuit 120 having a small capacity is set to be bidirectional so that power can be outputted from auxiliary power storage device 65 to electrical outlet 75. Therefore, a loss can be reduced when power is outputted from auxiliary power storage device 65 to electrical outlet 75.

Second Embodiment

In this second embodiment, when an increase in traveling power is expected based on information of a traveling path, the SOC of auxiliary power storage device 65 is raised in advance to prepare for a supply of power from auxiliary power storage device 65 to electrical outlet 75.

Figure 6:
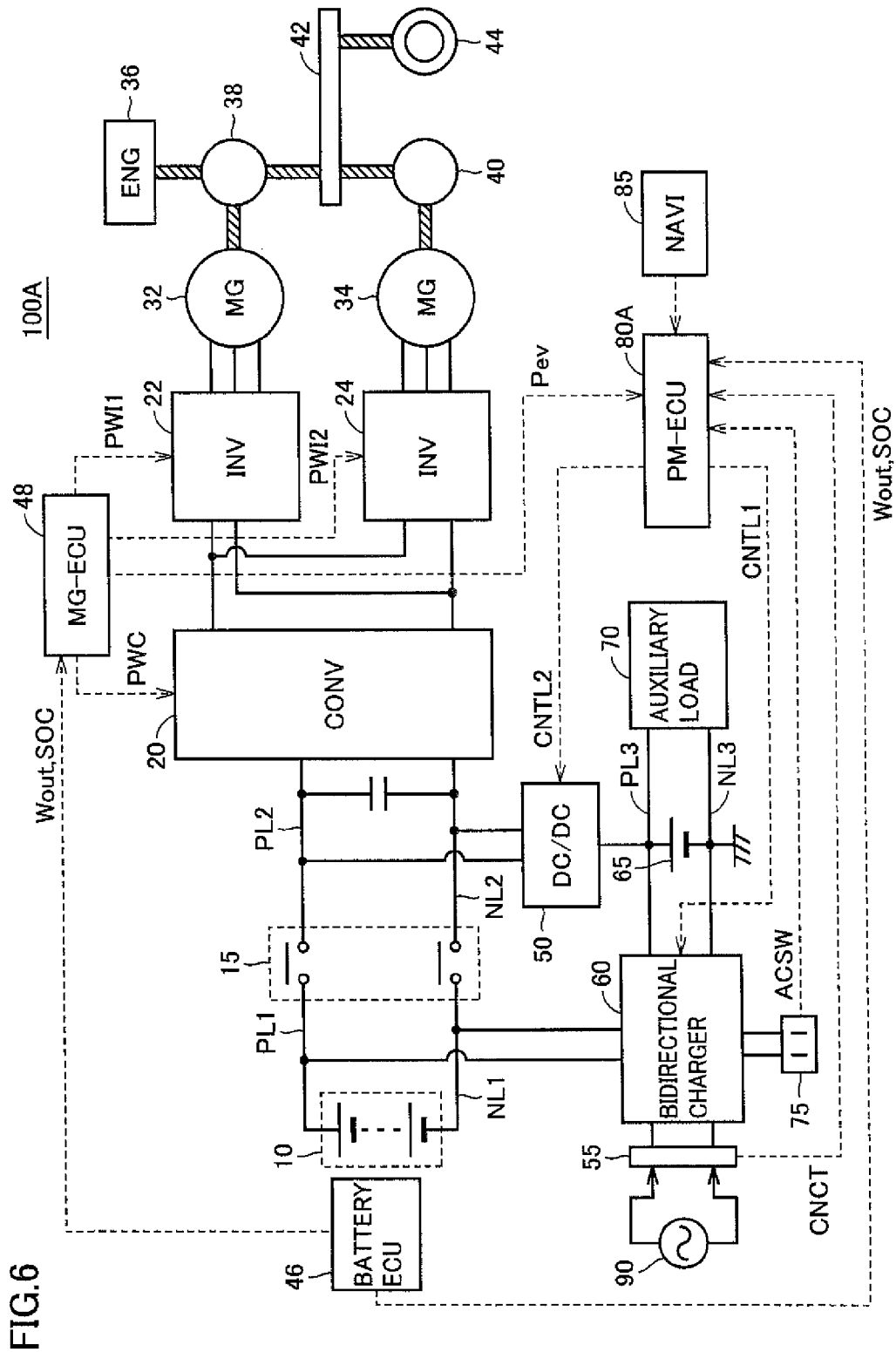
FIG. 6 represents an overall configuration of a hybrid vehicle shown as one example of an electrically-driven vehicle according to the second embodiment.

FIG. 6 represents an overall configuration of a hybrid vehicle shown as one example of an electrically-driven vehicle according to the second embodiment. Referring to FIG. 6, this hybrid vehicle 100A further includes a car navigation device 85 and also includes a PM-ECU 80A in place of PM-ECU 80 in the configuration of hybrid vehicle 100 according to the first embodiment shown in FIG. 1.

Car navigation device 85 collects information related to a traveling path to a destination and transmits the information to PM-ECU 80A. The traveling path information includes, for example, a distance to a destination, a gradient of a traveling path, a speed limit, and the like.

PM-ECU 80A estimates EV traveling power along a traveling path to a destination based on traveling path information received from car navigation device 85. For example, EV traveling power is estimated along a traveling path at each predetermined unit interval, and an increase in EV traveling power is estimated in a traveling section such as a slope, a highway, or the like. PM-ECU 80A executes a control of raising the SOC of auxiliary power storage device 65 before hybrid vehicle 100A travels in the traveling section for which an increase in the EV traveling power is estimated. Specifically, PM-ECU 80A controls DC/DC converter 50 so that power is supplied from main power storage device 10 via DC/DC converter 50 to auxiliary power storage device 65.

Other functions of PM-ECU 80A are the same as those of PM-ECU 80 of the first embodiment. Further, other configuration of hybrid vehicle 100A is also the same as that of hybrid vehicle 100 of the first embodiment.

Figure 7:
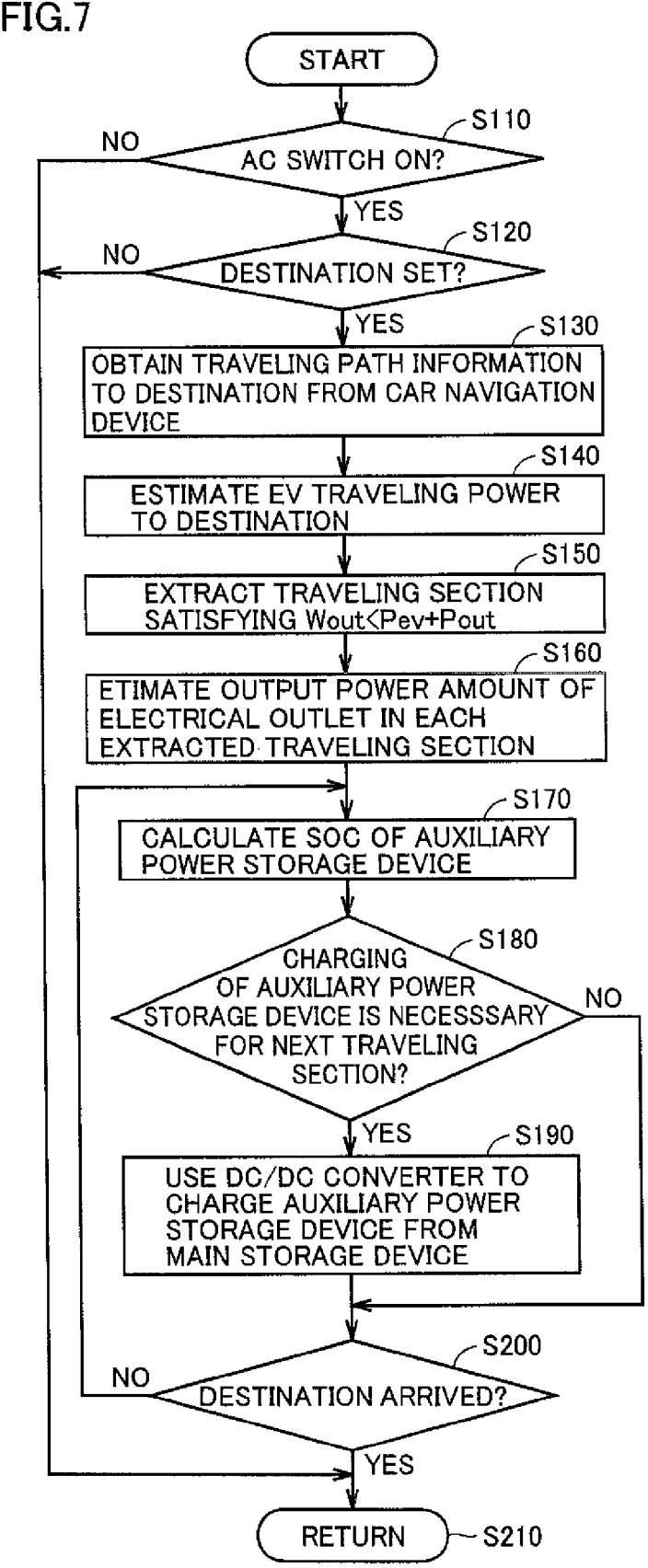
FIG. 7 represents a flowchart for description of the control executed by the PM-ECU shown in FIG. 6.

FIG. 7 represents a flowchart for describing the control executed by PM-ECU 80A shown in FIG. 6. The processes shown in this flowchart are also invoked from a main routine at every constant time or at each time when a certain condition is met, and then the processes are executed. Referring to FIG. 7, PM-ECU 80A determines whether or not an AC switch for allowing a user to request use of electrical outlet 75 is turned on (step S110). When it is determined that the AC switch is turned off (NO in step S110), PM-ECU 80A shifts the process to step S210 without executing subsequent series of processes.

In step S110, when it is determined that the AC switch is turned on (YES in step S110), PM-ECU 80A determines whether or not a destination is set in car navigation device 85 (step S120). When the destination is not set (NO in step S120), PM-ECU 80A shifts the process to step S210.

In step S120, when it is determined that a destination is set (YES in step S120), PM-ECU 80A obtains traveling path information to the destination (information such as a gradient of the traveling path, a speed limit, or the like) from car navigation device 85 (step S130). PM-ECU 80A then uses the obtained traveling path information to calculate EV requested power Pev along the traveling path to the destination, so that EV traveling power along the traveling path to the destination is estimated (step S140).

Next, PM-ECU 80A extracts a traveling section in which a value obtained by adding output power Pout of electrical outlet 75 to EV requested power Pev calculated in step S140 is larger than outputtable power Wout of main power storage device 10 (step S150). Output power Pout (W) of electrical outlet 75 is the rated power of electrical outlet 75 to prepare for the maximum use of electrical outlet 75.

Next, PM-ECU 80A estimates an output power amount (Wh) of electrical outlet 75 in each traveling section extracted in step S150 (step S160). For example, a traveling time in each of extracted traveling section can be estimated based on traveling path information to the destination obtained from car navigation device 85, so that the output power amount (Wh) of electrical outlet 75 in each traveling section can be calculated based on the estimated traveling time.

Next, PM-ECU 80A calculates the SOC of auxiliary power storage device 65 (step S170). The SOC of auxiliary power storage device 65 can be calculated by using various known methods based on a voltage, an input/output current, and the like of auxiliary power storage device 65.

Next, PM-ECU 80A determines whether or not it is necessary to charge auxiliary power storage device 65 in advance for the next traveling section from a current traveling point among traveling sections extracted in step S150 (step S180). Specifically, determination is made on whether or not it is necessary to charge auxiliary power storage device for the next traveling section extracted in step S150 based on the electrical outlet output power amount of the next traveling section calculated in step S160 and the SOC of auxiliary power storage device 65 calculated in step S170.

When it is determined that charging of auxiliary power storage device 65 is necessary (YES in step S180), PM-ECU 80A controls operation of DC/DC converter 50 so that power is supplied from main power storage device 10 via DC/DC converter 50 to auxiliary power storage device 65 (step S190). When it is determined that charging of auxiliary power storage device 65 is not necessary (NO in step S180), PM-ECU 80A shifts the process to step S200.

Next, PM-ECU 80A determines whether or not hybrid vehicle 100A has arrived at the destination based on the traveling path information from car navigation device 85 (step S200). When it is determined that hybrid vehicle 100A has not yet arrived at the destination (NO in step S200), PM-ECU 80A returns the process to step S170. When it is determined that hybrid vehicle 100A has arrived at the destination (YES in step S200), PM-ECU 80A shifts the process to step S210.

As described above, in this second embodiment, the SOC of auxiliary power storage device 65 is raised in advance to prepare for a supply of power from auxiliary power storage device 65 to electrical outlet 75 when an increase in the traveling power is expected. Thus, according to the second embodiment, disabling of electrical outlet 75 due to a shortage of power of auxiliary power storage device 65 can be avoided.

Third Embodiment

Also in the third embodiment, similarly to the second embodiment described above, when an increase in traveling power is expected based on a traveling path, the SOC of auxiliary power storage device 65 is raised in advance to prepare for a supply of power from auxiliary power storage device 65 to electrical outlet 75.

In this third embodiment, when power is supplied from main power storage device 10 to auxiliary power storage device 65 to raise the SOC of auxiliary power storage device 65, power can be supplied via the sub power supply circuit of the bidirectional charger from main power storage device 10 to auxiliary power storage device 65. The sub power supply circuit of the bidirectional charger is provided to supply power from external power supply 90 to auxiliary load 70 during the external charging, and the loss is small even though a capacity is small. Therefore, in this third embodiment, a power supply path is switched from main power storage device 10 to auxiliary power storage device 65 in accordance with the amount of power supplied from main power storage device 10 to auxiliary power storage device 65.

Figure 8:
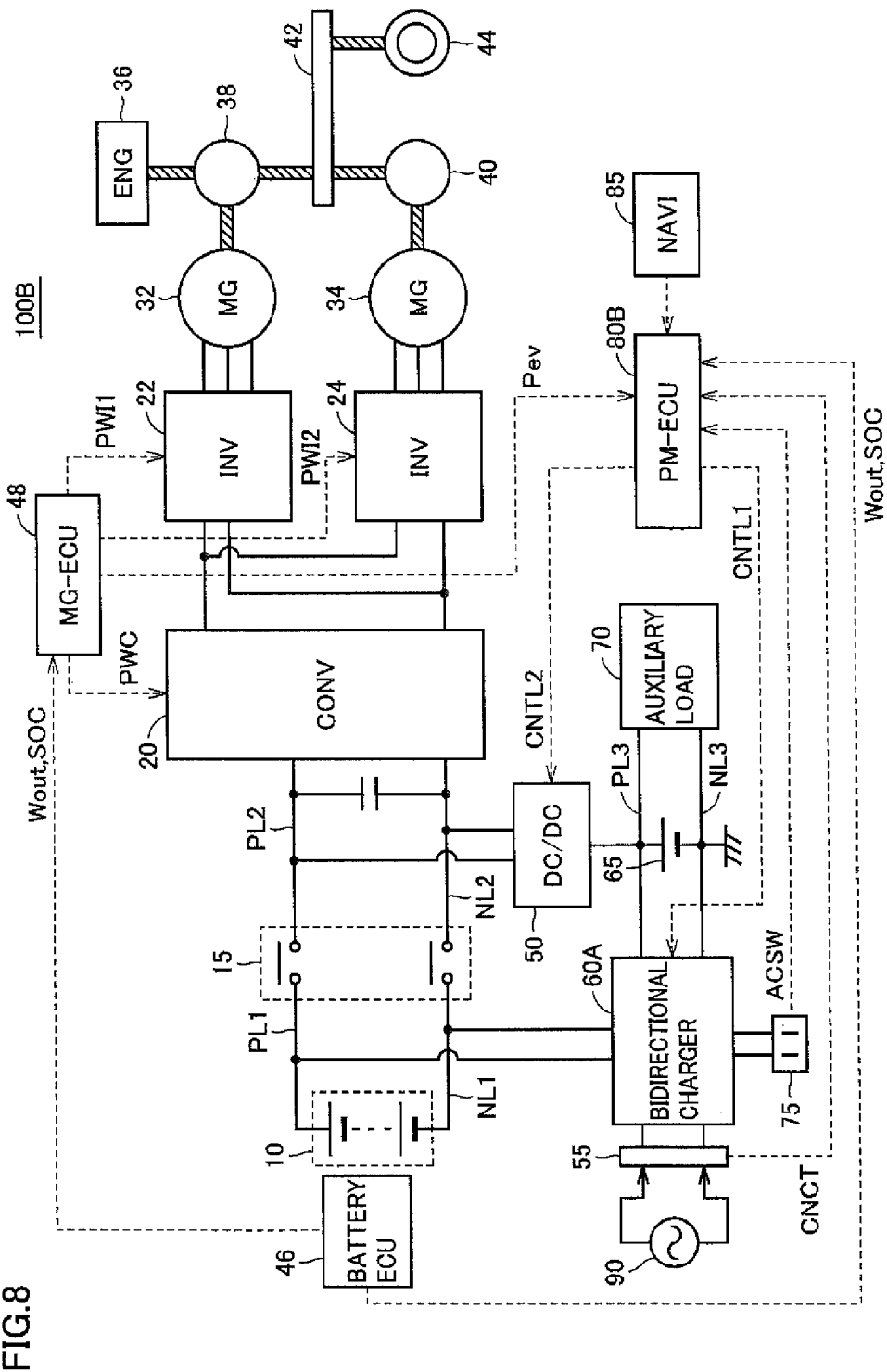
FIG. 8 represents an overall configuration of a hybrid vehicle shown as one example of an electrically-driven vehicle according to the third embodiment.

FIG. 8 represents an overall configuration of a hybrid vehicle which is shown as one example of an electrically-driven vehicle according to the third embodiment. Referring to FIG. 8, this hybrid vehicle 100B includes a bidirectional charger 60A and a PM-ECU 80B in place of bidirectional charger 60 and PM-ECU 80A respectively in the configuration of hybrid vehicle 100A in the second embodiment shown in FIG. 6.

Figure 9:
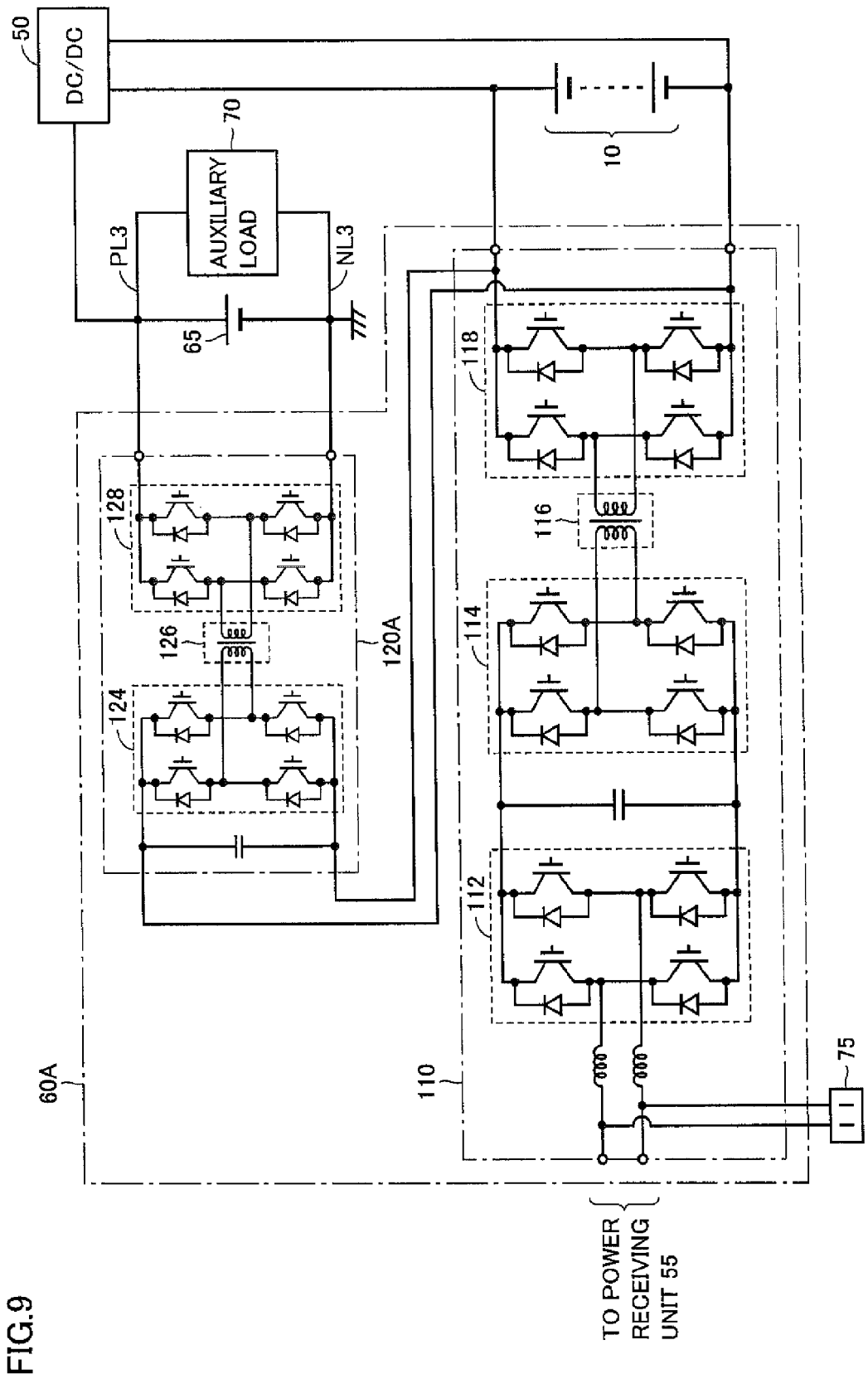
FIG. 9 represents a circuit of the bidirectional charger shown in FIG. 8.

FIG. 9 represents a circuit of bidirectional charger 60A shown in FIG. 8. Referring to FIG. 9, bidirectional charger 60A includes a sub power supply circuit 120A in place of sub power supply circuit 120 in the configuration of bidirectional charger 60 shown in FIG. 4. Sub power supply circuit 120A has a configuration in which AC/DC conversion unit 122 is not included in sub power supply circuit 120 shown in FIG. 4. The direct-current side of AC/DC conversion unit 124 is connected to the direct-current side of main circuit 110 (on the side of main power storage device 10).

This bidirectional charger 60A can supply power from main power storage device 10 via sub power supply circuit 120A to auxiliary power storage device 65. In other words, power outputted from main power storage device 10 is supplied to AC/DC conversion unit 124 of sub power supply circuit 120A and converted by AC/DC conversion unit 124 to high-frequency alternate-current power. The high-frequency alternate-current power outputted from AC/DC conversion unit 124 is given via insulation transformer 126 to AC/DC conversion unit 128, converted by AC/DC conversion unit 128 to direct-current power, and supplied to auxiliary power storage device 65.

During charging of main power storage device 10 by external power supply 90 (FIG. 8), power is supplied from power receiving unit 55 via main circuit 110 to main power storage device 10, and an output of main circuit 110 is further subjected to voltage conversion by sub power supply circuit 120A and supplied to auxiliary load 70 and auxiliary power storage device 65.

In this third embodiment, power can be supplied from main power storage device 10 via bidirectional charger 60A to auxiliary power storage device 65 as described above. Thus, there are two paths for supplying power from main power storage device 10 to auxiliary power storage device 65 to raise the SOC of auxiliary power storage device 65 in advance when an increase in traveling power is expected.

Figure 10:
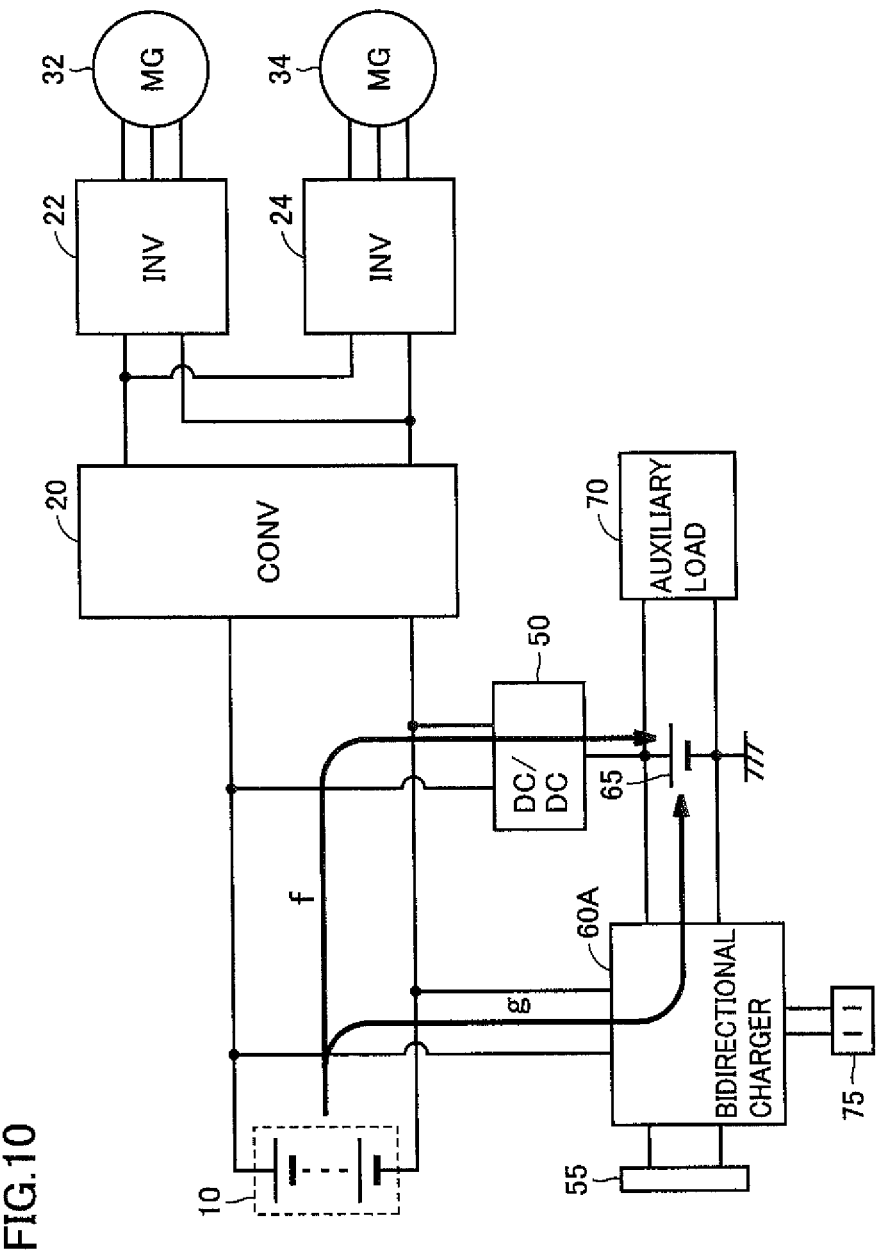
FIG. 10 represents a power supply path from the main power storage device to the auxiliary power storage device.

FIG. 10 represents a power supply path from main power storage device 10 to auxiliary power storage device 65. Referring to FIG. 10, as paths for supplying power from main power storage device 10 to auxiliary power storage device 65, there are two paths including a path "f" passing through DC/DC converter 50 and a path "g" passing through bidirectional charger 60A (more specifically, sub power supply circuit 120A).

DC/DC converter 50 is provided originally to generate power for auxiliary load 70, and it has enough capacity to supply power to auxiliary load 70. On the other hand, although bidirectional charger 60A is provided for external charging, it is configured to be bidirectional so as to enable a supply of power from main power storage device 10 and auxiliary power storage device 65 to electrical outlet 75 and a supply of power from main power storage device 10 to auxiliary power storage device 65. As shown in FIG. 9, a supply of power from main power storage device 10 to auxiliary power storage device 65 is performed via sub power supply circuit 120A of bidirectional charger 60A.

Sub power supply circuit 120A is provided to secure limited power of auxiliary load 70 operated during the external charging from external power supply 90, and it has a smaller capacity and a smaller loss as compared to DC/DC converter 50. Therefore, in this third embodiment, when power supplied from main power storage device 10 to auxiliary power storage device 65 to raise the SOC of auxiliary power storage device 65 in advance is within the rating of sub power supply circuit 120A of bidirectional charger 60A, power is supplied via sub power supply circuit 120A of bidirectional charger 60A from main power storage device 10 to auxiliary power storage device 65. On the other hand, when power supplied from main power storage device 10 to auxiliary power storage device 65 exceeds the rating of sub power supply circuit 120A of bidirectional charger 60A, power is supplied via DC/DC converter 50 from main power storage device 10 to auxiliary power storage device 65. Accordingly, the loss can be suppressed more than in the case where a supply of power via DC/DC converter 50 from main power storage device 10 to auxiliary power storage device 65 is performed uniformly.

Figure 11:
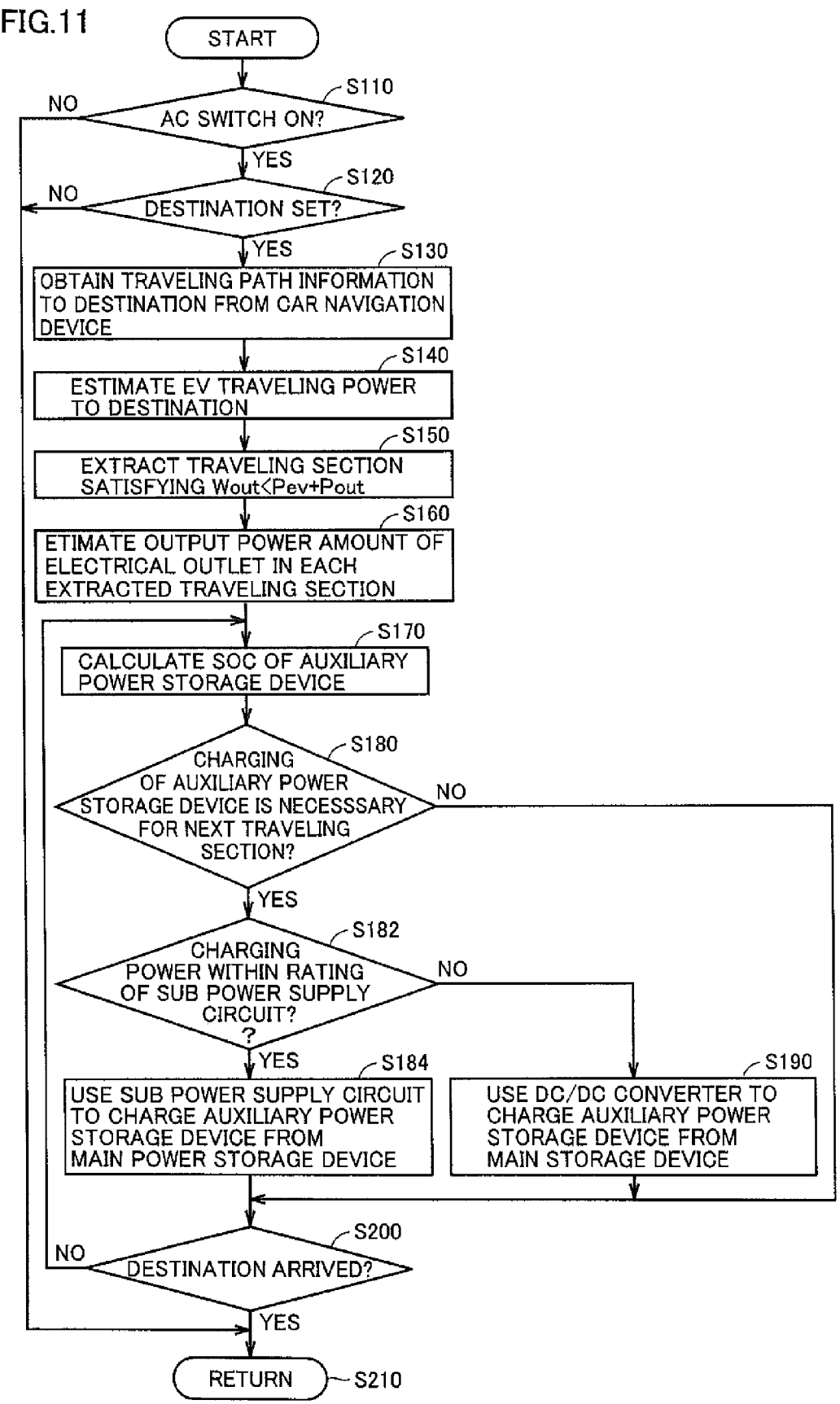
FIG. 11 represents a flowchart for description of the control executed by the PM-ECU shown in FIG. 8.

FIG. 11 represents a flowchart for describing the control executed by PM-ECU 80B shown in FIG. 8. Referring to FIG. 11, this flowchart further includes steps S182, S184 in the flowchart shown in FIG. 7. In other words, in step S180, when it is determined that it is necessary to charge auxiliary power storage device 65 in advance for the next traveling section from a current traveling point among traveling sections extracted in step S150 (YES in step S180), PM-ECU 80B determines whether or not charging power is within the rating of sub power supply circuit 120A (step S182). For example, when the SOC of auxiliary power storage device 65 is lowered significantly, and charging with power exceeding the rating of sub power supply circuit 120A is requested, it is determined that charging power exceeds the rating of sub power supply circuit 120A.

In step S182, when it is determined that charging power from main power storage device 10 to auxiliary power storage device 65 is within the rating of sub power supply circuit 120A (YES in step S182), PM-ECU 80B controls operation of sub power supply circuit 120A so that power is supplied from main power storage device 10 via sub power supply circuit 120A of bidirectional charger 60A to auxiliary power storage device 65 (step S184).

On the other hand, when it is determined that charging power from main power storage device 10 to auxiliary power storage device 65 exceeds the rating of sub power supply circuit 120A (NO in step S182), the process is shifted to step S190, and DC/DC converter 50 is controlled so that power is supplied from main power storage device 10 via DC/DC converter 50 to auxiliary power storage device 65.

As described above, in this third embodiment, in the case where the SOC of auxiliary power storage device 65 is raised in advance to prepare for a supply of power from auxiliary power storage device 65 to electrical outlet 75, when the amount of power supplied to auxiliary power storage device 65 is not large, power is supplied from main power storage device 10 to auxiliary power storage device 65 via sub power supply circuit 120A having a smaller capacity than DC/DC converter 50. Thus, according to the third embodiment, the loss can be suppressed more than the case where a supply of power is uniformly performed via DC/DC converter 50 from main power storage device 10 to auxiliary power storage device 65.

Fourth Embodiment

In the first to third embodiments described above, the electrically-driven vehicles which are externally chargeable were described. However, this invention can be applied also to the electrically-driven vehicle which does not have external charging function.

Figure 12:
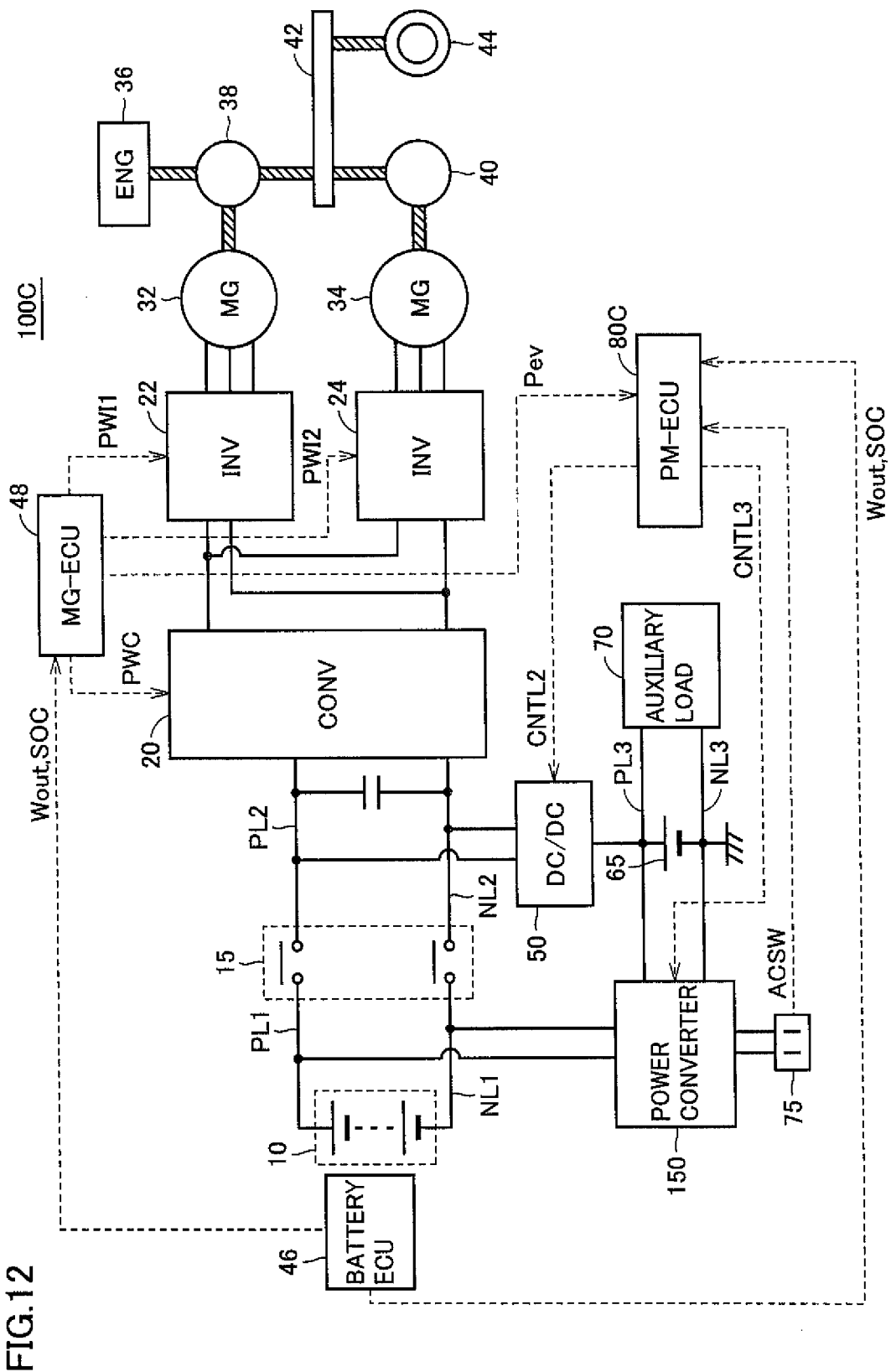
FIG. 12 represents an overall configuration of a hybrid vehicle shown as one example of an electrically-driven vehicle according to the fourth embodiment.

FIG. 12 represents an overall configuration of a hybrid vehicle shown as one example of an electrically-driven vehicle according to the fourth embodiment. Referring to FIG. 12, this hybrid vehicle 100C includes power converter 150 and PM-ECU 80C in place of bidirectional charger 60 and PM-ECU 80 respectively in the configuration of hybrid vehicle 100 shown in FIG. 1.

Figure 13:
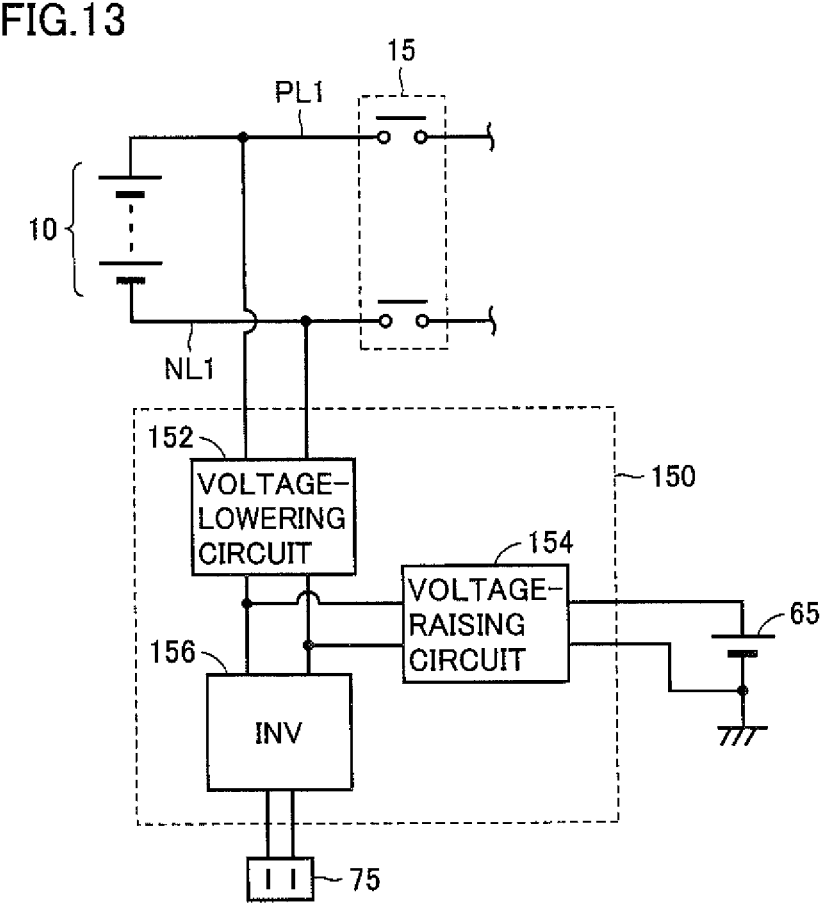
FIG. 13 represents a configuration of the power converter shown in FIG. 12.

FIG. 13 represents a configuration of power converter 150 shown in FIG. 12. Referring to FIG. 13, power converter 150 includes a voltage-lowering circuit 152, a voltage-raising circuit 154, and an inverter 156. Voltage-lowering circuit 152 is electrically connected to positive line PL1 and negative line NL1 to which main power storage device 10 is connected. Inverter 156 is connected between voltage-lowering circuit 152 and electrical outlet 75. Voltage-raising circuit 154 is connected between power lines and auxiliary power storage device 65, where the power lines are provided between voltage-lowering circuit 152 and inverter 156.

Voltage-lowering circuit 152 lowers the voltage of power outputted from main power storage device 10 and output the power to inverter 156. Voltage-raising circuit 154 raises the voltage of power outputted from auxiliary power storage device 65 and supplies the power to inverter 156. Inverter 156 converts direct-current power received from voltage-lowering circuit 152 or voltage-raising circuit 154 to predetermined alternate-current power and supply the power to electrical outlet 75.

Referring to FIG. 12 again, PM-ECU 80C executes a control of supplying power from bidirectional charger 60 to electrical outlet 75. Specifically, when EV requested power Pev received from MG-ECU 48 increases during the use of electrical outlet 75, PM-ECU 80C generates signal CNTL3 so as to subject power stored in auxiliary power storage device 65 to voltage conversion and supply the power to electrical outlet 17, and outputs the signal to power converter 150. For example, on the other hand, when EV requested power Pev is not large, PM-ECU 80C generates signal CNTL3 so as to supply power stored in main power storage device 10 to electrical outlet 75 and outputs the signal to power converter 150.

Other configurations of hybrid vehicle 100C are the same as those of hybrid vehicle 100 shown in FIG. 1.

By configuring voltage-raising circuit 154 shown in FIG. 13 to be able to convert power in a bidirectional manner, auxiliary power storage device 65 can be charged from main power storage device 10 via voltage-lowering circuit 152 and voltage-raising circuit 154. Accordingly, the functions similar to those of second and third embodiments can be achieved except for the external charging function.

As described above, also with the fourth embodiment, the effect similar to that of the first to third embodiments can be obtained.

In each of the embodiments described above, electrical outlet 75 is connected to AC/DC conversion unit 112 of main circuit 110 on a side of power receiving unit 55. However, the connection part of electrical outlet 75 is not limited to that location. Electrical outlet 75 may be connected to insulation transformer 116 on the primary side or the secondary side.

Further, in the description above, the EV traveling of hybrid vehicle 100 (100A to 100C) is described. However, this invention is not limited to the control during EV traveling of the hybrid vehicle, and it can be applied also to the HV traveling. Further, the scope of application of this invention is not limited to a hybrid vehicle but also includes electrically-driven vehicles such as an electric vehicle and a fuel cell vehicle having no engine mounted.

Further, in the description above, hybrid vehicle 100 (100A to 100C) shown as one example of an electrically-driven vehicle is described as a series/parallel type hybrid vehicle capable of splitting motive power of engine 36 by planetary gear 38 and transmitting the motive power to drive wheels 44 and motor generator 32. However, this invention can be applied also to hybrid vehicles of other types. In other words, this invention can be applied also to, for example, a so-called series-type hybrid vehicle which uses engine 36 only for driving motor generator 32 and generates drive force of a vehicle only with motor generator 34, and a motor-assist type hybrid vehicle with an engine as a main motive power and a motor providing an assist as needed.

In the description above, motor generator 34 corresponds to one example of "electric motor" in the present invention, and each of bidirectional chargers 60, 60A and power converter 150 corresponds to one example of "power conversion device" in this invention. Further, PM-ECU 80, 80A to 80C corresponds to one example of "control device" in this invention, and car navigation device 85 corresponds to one example of "information device" in this invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10 main power storage device; 15 SMR; 20 converter; 22, 24, 156 inverter; 32, 34 motor generator; 36 engine; 38, 40 planetary gear; 42 transmission gear; 44 drive wheels; 46 battery ECU; 48 MG-ECU; 50 DC/DC converter; 55 power receiving unit; 60, 60A bidirectional charger; 65 auxiliary power storage device; 70 auxiliary load; 75 electrical outlet; 80, 80A to 80C PM-ECU; 85 car navigation device; 90 external power supply; 100, 100A to 100C hybrid vehicle; 110 main circuit; 120, 120A sub power supply circuit; 112, 114, 118, 122, 124, 128 AC/DC conversion unit; 116, 126 insulation transformer; 150 power converter; 152 voltage-lowering circuit; 154 voltage-raising circuit; PL1 to PL3 positive line; NL1 to NL3 negative line.

The invention claimed is:
1. An electrically-driven vehicle, comprising:
a main power storage device;
an electric motor receiving a supply of power from said main power storage device and generating a travel driving force;

an auxiliary power storage device;

a power output unit configured to be able to output power to an electrical appliance including a home appliance;

a power conversion device electrically connected to said main power storage device, said auxiliary power storage device and said power output unit, and configured to be able to subject power stored in said main power storage device or power stored in said auxiliary power storage device to voltage conversion and output power to said power output unit; and a control device controlling said power conversion device to subject power stored in said auxiliary power storage device to voltage conversion and output power to said power output unit when said travel driving force increases during use of said power output unit.

2. The electrically-driven vehicle according to claim 1, wherein during use of said power output unit, when said travel driving force increases to cause a required output for said main power storage device to exceed outputtable power indicating power which can be outputted by said main power storage device, said control device controls said power conversion device to subject power stored in said auxiliary power storage device to voltage conversion and output power to said power output unit.

3. The electrically-driven vehicle according to claim 2, wherein said power conversion device includes a charger which subjects power supplied from a power supply provided outside of the vehicle to voltage conversion and charges said main power storage device and said auxiliary power storage device, and said charger is configured to be able to subject power conversion in a bidirectional manner so as to be able to subject power stored in said main power storage device or power stored in said auxiliary power storage device to voltage conversion and output power to said power output unit.

4. The electrically-driven vehicle according to claim 3, wherein said charger includes:

a main circuit configured to be able to subject voltage conversion in a bidirectional manner between said power supply and said main power storage device;

a sub power supply circuit configured to be able to subject voltage conversion in a bidirectional manner between said power supply and said auxiliary power storage device and having a smaller capacity than said main circuit.

5. The electrically-driven vehicle according to claim 2, wherein when said travel driving force increases, said control device further controls a state of charge of said auxiliary power storage device so as to raise a state of charge of said auxiliary power storage device in advance.

6. The electrically-driven vehicle according to claim 5, further comprising:

an information device having information related to a traveling path, wherein when an increase in said travel driving force is estimated based on traveling path information from said information device, said control device controls a state of charge of said auxiliary power storage device so as to raise a state of charge of said auxiliary power storage device in advance.

7. The electrically-driven vehicle according to claim 5, further comprising:

a voltage converter which subjects power outputted from said main power storage device to voltage conversion and outputs power to said auxiliary power storage device, wherein said power conversion device includes a charger which subjects power supplied from a power supply provided outside of the vehicle to voltage conversion and charges said main power storage device and said auxiliary power storage device, and said charger includes:

a main circuit configured to be able to subject voltage conversion in a bidirectional manner between said power supply and said main power storage device; and a sub power supply circuit configured to be able to subject voltage conversion in a bidirectional manner between said power supply and said auxiliary power storage device and having a smaller capacity than said main circuit, and said sub power supply circuit is electrically connected to said main circuit on a side of said main power storage device, and in a case where said control device controls a state of charge of said auxiliary power storage device so as to raise a state of charge of said auxiliary power storage device in advance, when power supplied to said auxiliary power storage device is within rating of said sub power supply circuit, said control device controls said sub power supply circuit such that power is supplied from said main power storage device to said auxiliary power storage device by said sub power supply circuit, and when power supplied to said auxiliary power storage device exceeds rating of said sub power supply circuit, said control device controls said voltage converter such that power is supplied from said main power storage device to said auxiliary power storage device by said voltage converter.

8. The electrically-driven vehicle according to claim 1, wherein said power conversion device includes a charger which subjects power supplied from a power supply provided outside of the vehicle to voltage conversion and charges said main power storage device and said auxiliary power storage device, and said charger is configured to be able to subject power conversion in a bidirectional manner so as to be able to subject power stored in said main power storage device or power stored in said auxiliary power storage device to voltage conversion and output power to said power output unit.

9. The electrically-driven vehicle according to claim 8, wherein said charger includes:

a main circuit configured to be able to subject voltage conversion in a bidirectional manner between said power supply and said main power storage device;

a sub power supply circuit configured to be able to subject voltage conversion in a bidirectional manner between said power supply and said auxiliary power storage device and having a smaller capacity than said main circuit.

10. The electrically-driven vehicle according to claim 1, wherein when said travel driving force increases, said control device further controls a state of charge of said auxiliary power storage device so as to raise a state of charge of said auxiliary power storage device in advance.

11. The electrically-driven vehicle according to claim 10, further comprising:
an information device having information related to a traveling path, wherein
when an increase in said travel driving force is estimated based on traveling path information from said information device, said control device controls a state of charge of said auxiliary power storage device so as to raise a state of charge of said auxiliary power storage device in advance.

12. The electrically-driven vehicle according to claim 10, further comprising:
a voltage converter which subjects power outputted from said main power storage device to voltage conversion and outputs power to said auxiliary power storage device, wherein
said power conversion device includes a charger which subjects power supplied from a power supply provided outside of the vehicle to voltage conversion and charges said main power storage device and said auxiliary power storage device, and
said charger includes:
a main circuit configured to be able to subject voltage conversion in a bidirectional manner between said power supply and said main power storage device; and
a sub power supply circuit configured to be able to subject voltage conversion in a bidirectional manner between said power supply and said auxiliary power storage device and having a smaller capacity than said main circuit, and
said sub power supply circuit is electrically connected to said main circuit on a side of said main power storage device, and
in a case where said control device controls a state of charge of said auxiliary power storage device so as to raise a state of charge of said auxiliary power storage device in advance, when power supplied to said auxiliary power storage device is within rating of said sub power supply circuit, said control device controls said sub power supply circuit such that power is supplied from said main power storage device to said auxiliary power storage device by said sub power supply circuit, and
when power supplied to said auxiliary power storage device exceeds rating of said sub power supply circuit, said control device controls said voltage converter such that power is supplied from said main power storage device to said auxiliary power storage device by said voltage converter.

13. A method for controlling an electrically-driven vehicle, said electrically-driven vehicle including:
a main power storage device;
an electric motor receiving a supply of power from said main power storage device and generates a travel driving force;
an auxiliary power storage device;
a power output unit configured to be able to output power to an electrical appliance including a home appliance; and
a power conversion device electrically connected to said main power storage device, said auxiliary power storage device and said power output unit, and configured to be able to subject power stored in said main power storage device or power stored in said auxiliary power storage device to voltage conversion and output power to said power output unit, and said controlling method comprising the steps of:
determining whether or not a use of said power output unit is requested; and
controlling said power conversion device to subject power stored in said auxiliary power storage device to voltage conversion and output power to said power output unit when said travel driving force increases in a case where a use of said power output unit is requested.

14. The method for controlling an electrically-driven vehicle according to claim 13, wherein the step of controlling said power conversion device includes the steps of:
determining whether or not an increase in said travel driving force causes a required output for main power storage device to exceed outputtable power indicating power which can be outputted by said main power storage device during use of said power output unit; and
controlling said power conversion device to subject power stored in said auxiliary power storage device to voltage conversion and output power to said power output unit when it is determined that said required output exceeds said outputtable power.

15. The method for controlling an electrically-driven vehicle according to claim 14, further comprising the step of controlling a state of charge of said auxiliary power storage device so as to raise a state of charge of said auxiliary power storage device in advance when said travel driving force increases.

16. The method for controlling an electrically-driven vehicle according to claim 15, wherein
said electrically-driven vehicle further includes a voltage converter which subjects power outputted from said main power storage device to voltage conversion and outputs power to said auxiliary power storage device, and
said power conversion device includes a charger which subjects power supplied from a power supply provided outside of the vehicle to voltage conversion and charges said main power storage device and said auxiliary power storage device, and
said charger includes:
a main circuit configured to be able to subject voltage conversion in a bidirectional manner between said power supply and said main power storage device; and
a sub power supply circuit configured to be able to subject voltage conversion in a bidirectional manner between said power supply and said auxiliary power storage device and having a smaller capacity than said main circuit, and
said sub power supply circuit electrically connected to said main circuit on a side of said main power storage device, and
said step of controlling a state of charge of said auxiliary power storage device includes the steps of:
determining whether or not power supplied to said auxiliary power storage device is within rating of said sub power supply circuit;
controlling said sub power supply circuit such that power is supplied from said main power storage device to said auxiliary power storage device by said sub power supply circuit when it is determined that said power is within rating of said sub power supply circuit in said step of determining; and
controlling said voltage converter such that power is supplied from said main power storage device to said auxiliary power storage device by said voltage converter when it is determined that said power exceeds the rating of said sub power supply circuit in said step of determining.

17. The method for controlling an electrically-driven vehicle according to claim 13, further comprising the step of controlling a state of charge of said auxiliary power storage device so as to raise a state of charge of said auxiliary power storage device in advance when said travel driving force increases.

18. The method for controlling an electrically-driven vehicle according to claim 10, wherein
said electrically-driven vehicle further includes a voltage converter which subjects power outputted from said main power storage device to voltage conversion and outputs power to said auxiliary power storage device, and
said power conversion device includes a charger which subjects power supplied from a power supply provided outside of the vehicle to voltage conversion and charges said main power storage device and said auxiliary power storage device, and
said charger includes:
a main circuit configured to be able to subject voltage conversion in a bidirectional manner between said power supply and said main power storage device; and
a sub power supply circuit configured to be able to subject voltage conversion in a bidirectional manner between said power supply and said auxiliary power storage device and having a smaller capacity than said main circuit, and
said sub power supply circuit electrically connected to said main circuit on a side of said main power storage device, and
said step of controlling a state of charge of said auxiliary power storage device includes the steps of:
determining whether or not power supplied to said auxiliary power storage device is within rating of said sub power supply circuit;
controlling said sub power supply circuit such that power is supplied from said main power storage device to said auxiliary power storage device by said sub power supply circuit when it is determined that said power is within rating of said sub power supply circuit in said step of determining; and
controlling said voltage converter such that power is supplied from said main power storage device to said auxiliary power storage device by said voltage converter when it is determined that said power exceeds the rating of said sub power supply circuit in said step of determining.

* * * * *